US008423289B2

(12) United States Patent
Kagawa et al.

(10) Patent No.: US 8,423,289 B2
(45) Date of Patent: Apr. 16, 2013

(54) INTER-MOVING BODY INTERFEROMETRIC POSITIONING SYSTEM, DEVICE AND METHOD THEREOF

(75) Inventors: Kazunori Kagawa, Nagoya (JP); Masafumi Uchihara, Toyota (JP); Yasuhiro Tajima, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 348 days.

(21) Appl. No.: 12/989,319

(22) PCT Filed: Apr. 23, 2009

(86) PCT No.: PCT/IB2009/005336
§ 371 (c)(1),
(2), (4) Date: Oct. 22, 2010

(87) PCT Pub. No.: WO2009/130583
PCT Pub. Date: Oct. 29, 2009

(65) Prior Publication Data
US 2011/0054790 A1 Mar. 3, 2011

(30) Foreign Application Priority Data
Apr. 25, 2008 (JP) .................. 2008-116309

(51) Int. Cl.
*G01S 5/14* (2006.01)
*G01C 21/00* (2006.01)
(52) U.S. Cl.
USPC ...................... 701/412; 701/468; 342/357.27
(58) Field of Classification Search .................. 701/412, 701/468, 469; 342/357.26, 357.27, 357.34
See application file for complete search history.

(56) References Cited

U.S. PATENT DOCUMENTS

| 6,181,274 | B1 * | 1/2001 | Pratt et al. ................ 342/357.27 |
| 6,795,771 | B2 * | 9/2004 | Fuchs et al. .................... 701/469 |
| 7,498,980 | B2 * | 3/2009 | Kagawa et al. .......... 342/357.27 |
| 2002/0032525 | A1 | 3/2002 | Yoshikawa et al. |
| 2002/0169545 | A1 * | 11/2002 | Toyooka ....................... 701/207 |
| 2005/0110676 | A1 | 5/2005 | Heppe et al. |
| 2008/0309550 | A1 | 12/2008 | Sairo et al. |

FOREIGN PATENT DOCUMENTS

| CN | 101048671 A | 10/2007 |
| JP | A-10-148665 | 6/1998 |
| JP | A-2001-337155 | 12/2001 |

(Continued)

OTHER PUBLICATIONS

International Search Report for International Patent Application No. PCT/IB2009/005336, mailed on Jul. 16, 2009.
Written Opinion for International Patent Application No. PCT/IB2009/005336, mailed on Jul. 16, 2009.
Notification of Reason(s) for Refusal for Corresponding Japanese Patent Application No. 2008-116309, dated Apr. 14, 2010 (w/ partial translation).

*Primary Examiner* — Tan Q Nguyen
(74) *Attorney, Agent, or Firm* — Oliff & Berridge, PLC

(57) ABSTRACT

An inter-moving body interferometric positioning system for carrying out positioning in coordination with three or more moving bodies that can mutually communicate, including: a reference vehicle decision unit for deciding on a single moving body to function as a reference vehicle from among three or more moving bodies, and a positioning unit for interferometrically determining respective relative positions of other moving bodies relative to the reference moving body that is to function as a reference vehicle decided on by the reference moving body decision unit using satellite wave monitoring data monitored in each of the three or more moving bodies. This inter-moving body interferometric positioning system specifies relative positions among the other moving bodies using positioning results of the positioning unit.

19 Claims, 10 Drawing Sheets

FOREIGN PATENT DOCUMENTS

| | | |
|---|---|---|
| JP | A-2002-517731 | 6/2002 |
| JP | A-2005-16955 | 1/2005 |
| JP | A-2005-207894 | 8/2005 |
| WO | WO 2008/035139 A1 | 3/2008 |

* cited by examiner

20 REFERENCE VEHICLE    30 NON-REFERENCE VEHICLE

INTER-MOVING BODY INTERFEROMETRIC POSITIONING SYSTEM, DEVICE AND METHOD THEREOF

BACKGROUND OF THE INVENTION

1. Field of the Invention

This invention relates to an inter-moving body interferometric positioning system, device and method thereof for carrying out positioning in coordination with other moving bodies in the vicinity.

2. Description of the Related Art

A relative position calculation device is available based on vehicle-to-vehicle communication that is provided with a relative position calculation unit using global positioning system (GPS) radio wave propagation time difference for determining the relative position of a nearby vehicle based on a host vehicle by determining the difference between GPS radio wave propagation time data of a nearby vehicle and GPS radio wave propagation time data of the host vehicle together with establishing and solving a simultaneous expression between three or more of the thus determined GPS radio wave propagation time difference values and an unknown number of relative positions (see, for example, Japanese Patent Application Publication No. 10-148665 (JP-A-10-148665))

However, as is described in JP-A-10-148665, although various methods have been proposed for specifying relative position between two moving bodies using GPS data, the case for carrying out determination of relative position among three or more moving bodies has yet to be considered.

Here, in the case for determining relative position among three or more moving bodies, when positioning between each vehicle is carried out in a manner similar to the methods used in the case for carrying out positioning between two moving bodies, not only the communication load and calculation load increase, there is also a problem of being unable to attain consistency in the positional relationships among a plurality of vehicles. For example, in the case of determining relative position among three moving bodies, if the relative positions of two other vehicles in the vicinity is determined in each vehicle, efficiency overall becomes poor. In addition, there is also an absence of consistency in the positional relationships among the vehicles as determined by each vehicle due to the vehicles used as a reference differing between each vehicle.

SUMMARY OF THE INVENTION

The invention provides an inter-moving body interferometric positioning system, device and method thereof capable of determining relative positions among three or more moving bodies accurately and with efficient positioning processing.

A first aspect of the invention relates to an inter-moving body interferometric positioning system, mounted in a moving body, for carrying out positioning in coordination with two or more other moving bodies in the vicinity of the moving body. This inter-moving body interferometric positioning device is provided with: monitoring data acquisition means for acquiring monitoring data by monitoring satellite waves in the moving body; reference moving body decision means for deciding on a single reference moving body from among the moving body and the other moving bodies; communication means for carrying out communication between the moving body and the other moving bodies; and positioning means for interferometrically determining a relative position of the moving body relative to the reference moving body and outputting a positioning result by using monitoring data of the moving body acquired with the monitoring data acquisition means and monitoring data acquired by the other moving bodies. In the case the moving body has been decided to be the reference moving body by the reference moving body decision means, the communication means transmits the monitoring data acquired by the monitoring data acquisition means to the other moving bodies, and receives, from the other moving bodies, positioning results which are obtained by interferometric positioning in the other moving bodies, and which show the relative positions of the other bodies relative to the moving body. In the case one of the other moving bodies is decided to be the reference moving body by the reference moving body decision means, the communication means receives satellite wave monitoring data transmitted from the reference moving body, and the positioning means carries out interferometric positioning using the monitoring data acquired with the monitoring data acquisition means and the monitoring data monitored in the reference moving body, and transmits the positioning result outputted by the positioning means to the reference moving body.

In a second aspect thereof, the invention relates to an inter-moving body interferometric positioning device, mounted in a moving body, for carrying out positioning in coordination with two or more other moving bodies in the vicinity of the moving body. The inter-moving body interferometric positioning device is provided with: monitoring data acquisition means for acquiring monitoring data by monitoring satellite waves in the moving body; reference moving body decision means for deciding on a single reference moving body from among the moving body and the other moving bodies; communication means for carrying out communication between the moving body and the other moving bodies; and positioning means for interferometrically determining relative positions of the other moving bodies relative to the moving body and outputting the positioning result by using the monitoring data of the moving body acquired with the monitoring data acquisition means and the monitoring data acquired by the other moving bodies. In the case the moving body has been decided to be the reference moving body by the reference moving body decision means, the communication means receives the monitoring data transmitted from at least one of the other moving bodies, the positioning means interferometrically determines the relative positions of the other moving bodies relative to the moving body using the monitoring data acquired with the monitoring data acquisition means and the monitoring data received from the other moving bodies, and the communication means transmits the positioning result output by the positioning means to the other moving bodies. In the case one of the other moving bodies has been decided to be the reference moving body by the reference moving body decision means, the communication means transmits the monitoring data acquired with the monitoring data acquisition means to the reference moving body, and the communication means receives, from the reference moving body, positioning results which are obtained by interferometric positioning in the reference moving body and which show the relative position of the moving body relative to the reference moving body.

In the first and second aspects above, the reference moving body decision means may decide the reference moving body based on a traveling status of the moving body and a traveling status of the other moving bodies.

In the first and second aspects above, the reference moving body decision means may decide on one specific moving body in a stopped state from among the moving body and the other moving bodies to be the reference moving body.

In the first and second aspects above, the reference moving body decision means may decide the reference moving body based on a satellite that can be monitored in the moving body and a satellite that can be monitored in the other moving bodies.

In the first and second aspects above, the reference moving body decision means may decide on one specific moving body having at least the minimum required number of common satellites and having the largest number of common satellites from among the moving body and the other moving bodies to be the reference moving body.

In the first and second aspects above, the reference moving body decision means may decide the reference moving body based on a alignment of satellites capable of being monitored in the moving body and each of the positions of the moving body and the other moving bodies.

In the first and second aspects above, the reference moving body decision means may decide the reference moving body from among moving bodies arranged along a direction of a short axis of an error ellipse determined by the satellite alignment.

In the first and second aspects above, the reference moving body decision means may decide the reference moving body based on a reception status of satellite waves in the moving body and a reception status of satellite waves in the other moving bodies.

In the first and second aspects above, the reference moving body decision means may decide on one specific moving body having the maximum continuous reception time of satellite waves from among the moving body and the other moving bodies to be the reference moving body.

In the first and second aspects above, the reference moving body decision means may be provided in at least one of the moving body, the other moving bodies, a moving body other than the moving body and the other moving bodies, and roadside equipment.

In a third aspect thereof, the invention relates to an inter-moving body interferometric positioning method for carrying out positioning in coordination with three or more moving bodies that can mutually communicate. The inter-moving body interferometric positioning method includes: acquiring monitoring data by monitoring satellite waves in each of the three or more moving bodies; deciding on a single reference moving body from among the three or more moving bodies; transmitting monitored monitoring data to other two or more moving bodies from the reference moving body; receiving the monitoring data, transmitted from the reference moving body, in each of the two or more other moving bodies; interferometrically determining a relative position of the moving body relative to the reference moving body using the monitoring data monitored in each of the other two or more moving bodies and the monitoring data of the reference moving body; and transmitting the positioning results obtained in each of the other two or more moving bodies to the reference moving body and vehicles other than the moving body.

In a fourth aspect thereof, the invention relates to an inter-moving body interferometric positioning system. The inter-moving body interferometric positioning system includes: reference moving body decision means for deciding on a single reference moving body from among three or more moving bodies that can mutually communicate; monitoring data supply means, in the reference moving body decided by the reference moving body decision means, for supplying satellite wave monitoring data monitored in the reference moving body to each of two or more non-reference moving bodies other than the reference moving body among the three or more moving bodies; positioning means for interferometrically determining relative positions of the non-reference moving bodies relative to the reference moving body using the data supplied from the reference moving body and the satellite wave monitoring data monitored in the non-reference moving bodies; and transmission means, in each of the non-reference moving bodies, for transmitting positioning results of the positioning means to other non-reference moving bodies other than the reference moving body and the moving body.

In a fifth aspect thereof, the invention relates to an inter-moving body interferometric positioning system for carrying out positioning in coordination with three or more moving bodies that can mutually communicate. The inter-moving body interferometric positioning system includes: reference moving body decision means for deciding on a single reference moving body from among three or more moving bodies; positioning means for interferometrically determining respective relative positions of other moving bodies relative to the reference moving body decided on by the reference moving body decision means using satellite wave monitoring data monitored in each of the three or more moving bodies; and position specifying means for specifying relative positions among the other moving bodies using positioning results of the positioning means.

In the fifth aspect, the positioning means is respectively provided in the other moving bodies, and the positioning means may, in each of the other moving bodies, interferometrically determine the relative position of the moving body relative to the reference moving body.

In the fifth aspect, the inter-moving body interferometric positioning system may be further provided with transmission means, in each of the other moving bodies, for transmitting positioning results of the positioning means to a moving body other than the moving body from among the three or more moving bodies.

In the fifth aspect, the positioning means for interferometrically determining the relative position of one other moving body relative to the reference moving body may be provided in at least one of the reference moving body and the one other moving body.

In a sixth aspect thereof, the invention relates to an inter-moving body interferometric positioning device, mounted in a moving body, for carrying out positioning in coordination with two or more other moving bodies in the vicinity of the moving body. The inter-moving body interferometric positioning device includes: monitoring data acquisition means for acquiring monitoring data by monitoring satellite waves in the moving body; reference moving body decision means for deciding on a single reference moving body from among the moving body and the other moving bodies; communication means for carrying out communication between the moving body and the other moving bodies; and positioning means for interferometrically determining a relative position of the moving body relative to the reference moving body using the monitoring data of the moving body acquired with the monitoring data acquisition means and the monitoring data acquired by the other moving bodies and for outputting the positioning result. In the case the moving body is decided to be the reference moving body by the reference moving body decision means, the communication means transmits the monitoring data acquired by the monitoring data acquisition means from the moving body or one of the other moving bodies to the moving body or the other one of the other moving bodies, and the communication means receives positioning results which are interferometrically determined in the other one of the other moving bodies, and which show the relative positions of the other moving bodies relative to the moving body from the other one of the other moving bodies. In the case one of the other moving bodies is decided to be the reference moving body by the reference moving body decision means, the communication means receives satellite wave monitoring data transmitted from the moving body or one of the other moving bodies, and the positioning means carries out interferometric positioning using the monitoring data acquired with the monitoring data acquisition means and the monitoring data acquired with the moving body or the other one of the other moving bodies, and transmits positioning results output by the positioning means to the one of the other moving bodies.

According to the aspects described above, an inter-moving body interferometric positioning system, device and method are obtained that enable the relative positions of three or more moving bodies to be determined accurately and with efficient positioning processing.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF AN EMBODIMENT

The following provides an explanation of the best mode for carrying out the invention with reference to the drawings.

Figure 1:
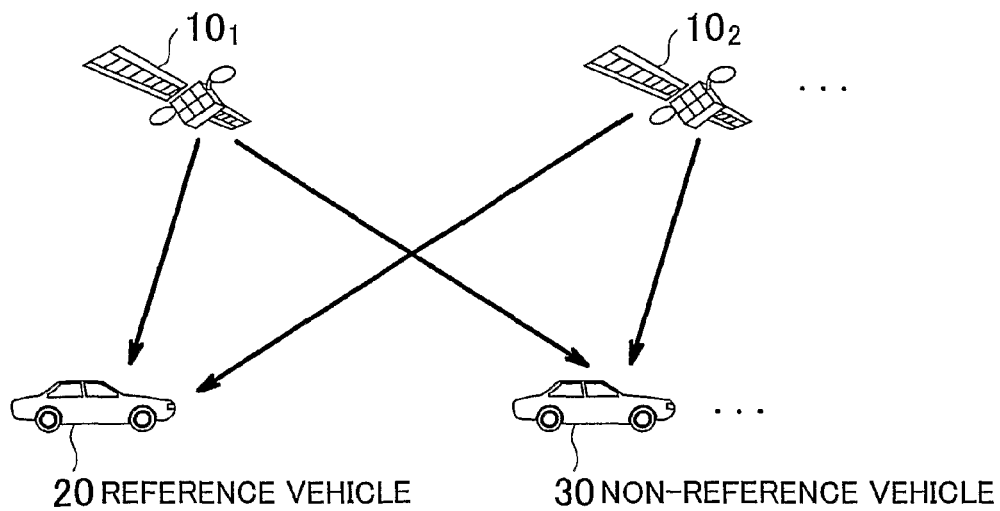
FIG. 1 is a system block diagram showing the overall configuration of an embodiment of the inter-moving body interferometric positioning system of the invention and a GPS.

FIG. 1 is a system block diagram showing the overall configuration of an embodiment of the inter-moving body interferometric positioning system of the invention and a GPS. As shown in FIG. 1, the GPS is provided with a GPS satellite 10 encircling the earth.

The GPS satellite 10 continuously broadcasts navigation messages towards the earth. The navigation messages contain orbital data, clock correction values and ionosphere correction coefficients relating to the corresponding GPS satellite 10. Navigation messages are disseminated by coarse and acquisition (C/A) codes and continuously broadcast towards the earth by loading on L1 carrier wave (frequency: 1575.42 MHz).

Twenty-four GPS satellites 10 encircle the earth at an altitude of about 20,000 km, and four GPS satellites 10 are uniformly arranged in every six earth orbital planes and inclined by 55 degrees each. Thus, as long as the sky is widely open, at least five GPS satellites 10 can be monitored at any time from any location on the earth.

A vehicle 20 is a vehicle functioning as a reference vehicle, and may also be referred to as the reference vehicle hereinafter. A non-reference vehicle 30 is a target vehicle for which relative position is determined with respect to the vehicle 20 (reference vehicle), and may also be referred to as the non-reference vehicle hereinafter.

Note that since the reference vehicle is decided in accordance with various types of situations as will be described later, although a certain vehicle may be the reference vehicle at one time, it may also be a non-reference vehicle at another time. Thus, when a certain vehicle is the reference vehicle, it is referred to as the vehicle 20, and when a certain vehicle is a non-reference vehicle, it is referred to as non-reference vehicle 30. Since the invention is preferable when two or more non-reference vehicles 30 are present, the following description assumes that there are two or more non-reference vehicles 30 present, and that there are three or more vehicles overall, including a single reference vehicle 20, present in a vehicle group.

Furthermore, a vehicle is merely one example of a moving body, and examples of other moving bodies include motorcycles, railroad cars, marine vessels, aircraft, forklifts, robots and information terminals such as cellular telephones moving accompanying the movement of a person.

Figure 2:
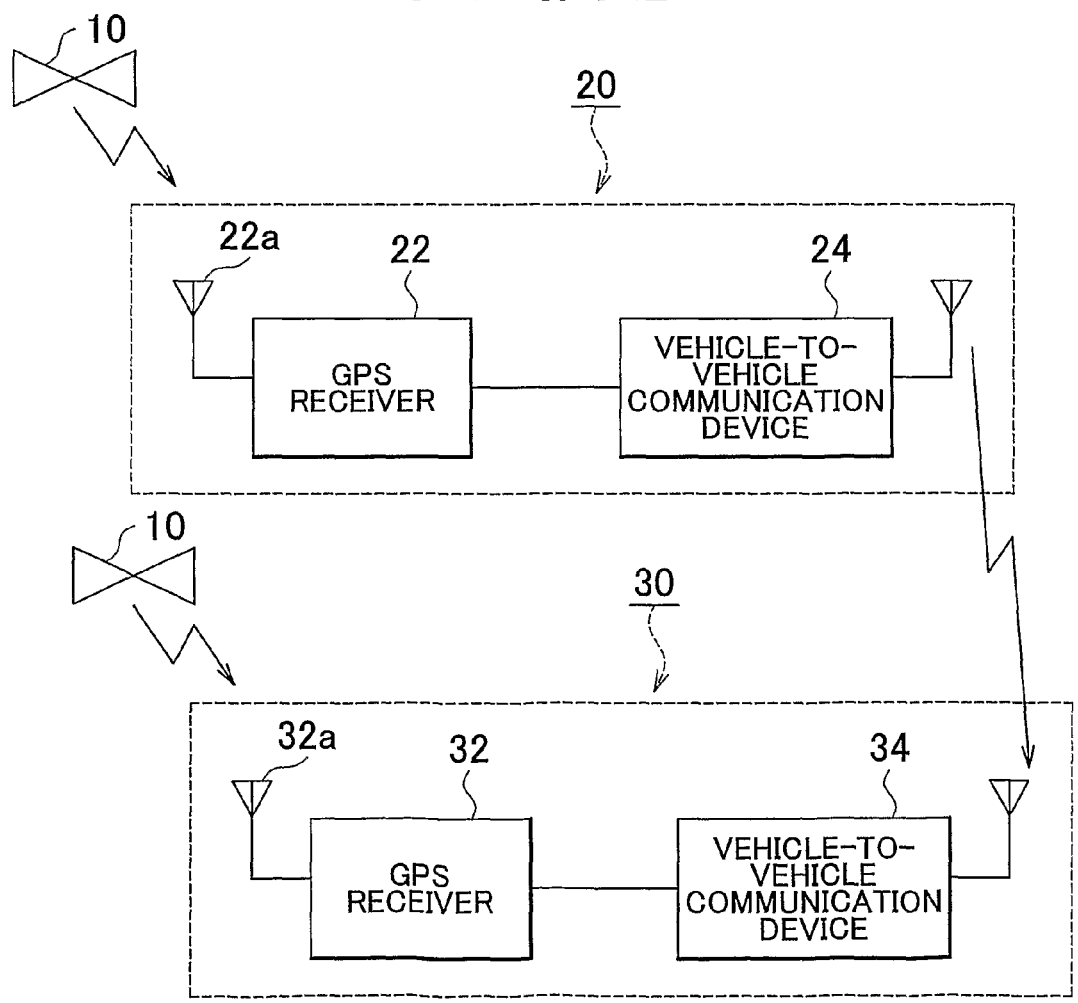
FIG. 2 is a drawing showing an example of the main configuration of an inter-moving body interferometric positioning device mounted in a vehicle.

FIG. 2 is a drawing showing the main configuration of the vehicle 20 and the non-reference vehicle 30. The vehicle 20 is provided with a GPS receiver 22 and a vehicle-to-vehicle communication device 24. In addition, the non-reference vehicle 30 is provided with a GPS receiver 32 and a vehicle-to-vehicle communication device 34.

The GSP receivers 22 and 32 each has an oscillator (not shown) with its frequency that matches the carrier frequency of the GPS satellite 10. The GPS receivers 22 and 32 convert radio waves (satellite signals) received from the GPS satellite 10 via GPS antennas 22a and 32a to an intermediate frequency followed by extracting navigation messages by carrying out C/A code synchronization using C/A codes generated within the GPS receivers 22 and 32.

The GPS receiver 22 measures an integrated value $\Phi_{ik}(t)$ of a carrier wave phase at time t as shown in equation (1) based on a carrier wave from a GPS satellite $10_i$. The phase integrated value $\Phi_{ik}$ may be measured for both an L1 wave and L2 wave (frequency: 1227.6 MHz).

$$\Phi_{ik}(t) = \Theta_{ik}(t) - \Theta_{ik}(t-\tau_k) + N_{ik} + \epsilon_{ik}(t) \quad \text{(Equation 1)}$$

Furthermore, the suffix i (=1, 2, . . . ) of the phase integrated value $\Phi_{ik}$ (indicates a number assigned to the GPS satellite $10_i$, while the suffix k indicates an integrated value of the reference vehicle. $N_{ik}$ indicates an integral value bias, while $\epsilon_{ik}$ indicates noise (error).

In addition, as shown in equation (2), the GPS receiver 22 measures a pseudo distance $\rho_{ik}$ based on C/A codes loaded on each carrier wave from the GPS satellite $10_i$.

$$\rho_{ik}(t)=c\tau_k+b_k \quad \text{(Equation 2)}$$

Here, c represents the speed of light, $b_k$ is also referred to as clock bias and corresponds to distance error attributable to clock error within the GPS receiver 22.

The vehicle 20 transmits the phase integrated value $\Phi_{ik}$ and pseudo distance $\rho_{ik}$ measured in the GPS receiver 22 to the non-reference vehicle 30 by the vehicle-to-vehicle communication device 24.

As similarly shown in equation (3), the GPS receiver 32 measures an integrated value $\Phi_{iu}$ of a carrier wave phase based on a carrier wave from a GPS satellite $10_i$. The phase integrated value $\Phi_{iu}$ may be measured for both an L1 wave and L2 wave. Furthermore, with respect to the phase integrated value $\Phi_{iu}$, the suffix i (=1, 2, . . . ) indicates a number assigned to the GPS satellite $10_i$, while the suffix u indicates that this is an integrated value of the non-reference vehicle 30. As indicated in equation (3), the phase integrated value $\Phi_{iu}$ is similarly obtained as the difference between the phase $\Theta_{iu}(t)$ of the oscillator at a carrier wave reception time t and the carrier wave phase $\Theta_{iu}(t-\tau)$ during generation of a satellite signal in the GPS satellite $10_i$.

$$\Phi_{iu}(t)=\Theta_{iu}(t)-\Theta_{iu}(t-\tau_u)+N_{iu}+\epsilon_{iu}(t) \quad \text{(Equation 3)}$$

Here, $\tau_u$ indicates the travel time from the GPS satellite 10 to the GPS receiver 32, and $\epsilon_{iu}$ represents noise (error). Furthermore, although the GPS receiver 32 is able to accurately measure the phase of the carrier wave phase within one wavelength at the time monitoring of phase difference begins, the number of the wavelength to which that phase difference corresponds cannot be determined. Consequently, an integral value bias $N_{iu}$ is introduced into the phase integrated value $\Phi_{iu}(t)$ in the form of an uncertain element as shown in equation (3).

In addition, the GPS receiver 32 measures pseudo distance $\rho_{iu}$ based on a C/A code loaded on each carrier wave from the GPS satellite $10_i$. The pseudo distance $\rho_{in}$ measured here contains error such as distance error as in the following equation (4).

$$\rho_{iu}(t)=c\tau_u+b_u \quad \text{Equation (4)}$$

Here, $b_u$ is also referred to as clock bias, and corresponds to distance error attributable to clock error within the GPS receiver 32.

In addition, the GPS receiver 32 carries out various processing to be described later with reference to FIG. 2 in addition to carrying out the measurement described above.

The vehicle-to-vehicle communication devices 24 and 34 are configured so as to carry out two-way communication in order to exchange various data to be described later. In this embodiment, the vehicle-to-vehicle communication device 24 of the reference vehicle 20 transmits the phase integrated value $\Phi_{ik}$ and the pseudo distance $\rho_{ik}$ measured with the GPS receiver 22 to the vehicle-to-vehicle communication device 34 of the non-reference vehicle 30 via a wireless communication network. In the following explanation, data consisting of the phase integrated value $\Phi_{ik}$ and the pseudo distance $\rho_{ik}$ measured with the GPS receiver 22 is also summarily referred to as "monitoring data", data consisting of the phase integrated value $\Phi_{ik}$ is also respectively referred to as "L1 data" and "L2 data" corresponding to the L1 wave and L2 wave, respectively, and data consisting of pseudo distance $\rho_{ik}$ is also referred to as "C/A data". In addition, in this embodiment, the vehicle-to-vehicle communication device 34 of the non-reference vehicle 30 transmits positioning results determined in the non-reference vehicle 30 (namely the relative position of the non-reference vehicle 30 relative to the vehicle 20 to be described later) to the vehicle-to-vehicle communication device 24 of the reference vehicle 20 and the vehicle-to-vehicle communication device 34 of other non-reference vehicle 30 via a wireless communication network. In addition, in this embodiment, other information (such as information indicating operating status to be described later or information representing independent positioning results) is exchanged between the vehicle-to-vehicle communication device 24 of the reference vehicle 20 and the vehicle-to-vehicle communication device 34 of the non-reference vehicle 30 as necessary.

Figure 3:
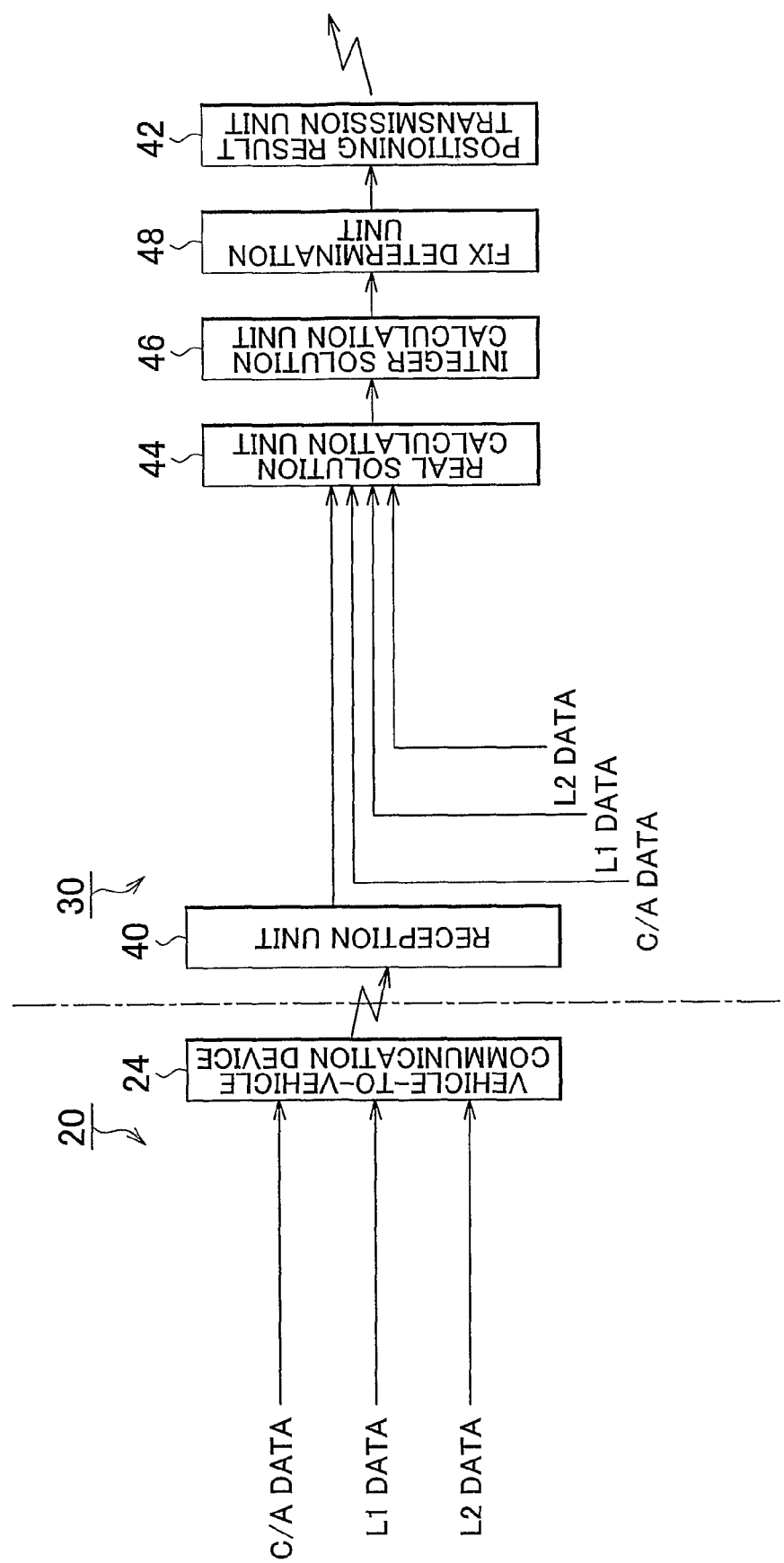
FIG. 3 is a block diagram showing the main processing respectively executed by each vehicle of the embodiment.

FIG. 3 is a block diagram showing main processing respectively executed in the vehicles 20 and 30 of this embodiment. Furthermore, in the configuration in the vehicle 30, a reception unit 40 and a positioning result transmission unit 42 are realized by the vehicle-to-vehicle communication device 34. A real solution calculation unit 44, an integer solution calculation unit 46 and a FIX determination unit 48 are realized by the GPS receiver 32 or may be realized by another microcomputer and the like connected to the GPS receiver 32.

As shown in FIG. 3, in a reference vehicle in the form of vehicle 20, monitoring data transmission data composed of monitored L1 data, L2 data and C/A data is generated at a prescribed cycle, and supplied to the non-reference vehicle 30 by the vehicle-to-vehicle communication device 24. In addition, in the vehicle 20, the position of the vehicle 20 is determined and that determined position is supplied to the non-reference vehicle 30 at a prescribed cycle. This positioning may be realized by independent positioning using monitored C/A data, for example. Since independent positioning methods using C/A data are widely available, an explanation thereof is omitted.

In the non-reference vehicle 30, monitoring data is received from the reference vehicle at a prescribed cycle in the reception unit 40. In addition, the phase integrated value $\Phi_{iu}$ (L1 data, L2 data) and the pseudo distance $\rho_{iu}$ (C/A data) of the non-reference vehicle 30 are acquired in the GPS receiver 32. Each of the reference vehicle monitoring data and non-reference vehicle 30 monitoring data is synchronously acquired using a GPS time or PPS signal and the like.

In the real solution calculation unit 44, the relative position of the non-reference vehicle 30 relative to the vehicle 20 is determined using the least squares method by using the double phase difference of monitoring data as the observed quantity, and using double phase difference of the position of the non-reference vehicle 30 and the integral value bias as state variables. For example, the position of the non-reference vehicle 30 may be determined using the procedure described below. Although the following description explains the case of using only the L1 wave for the phase integrated value in order to simplify the explanation, in the case of also using the phase integrated value of the L2 wave, the phase integrated value of the L2 wave is added in the same manner as the phase integrated value of the L1 wave.

First, the double phase difference of phase integrated values relating to two GPS satellites $10_j$ and $10_h$ for which bearings have been obtained (i=j, h provided that j≠h) is represented by equation (5).

$$\Phi^{jh}_{ku}=(\Phi_{jk}(t)-\Phi_{ju}(t))-(\Phi_{hk}(t)-\Phi_{iu}(t)) \quad \text{(Equation 5)}$$

On the other hand, the double phase difference of phase integrated values $\Phi^{jh}_{ku}$ becomes as shown in equation (6) based on the physical sense of (distance between GPS satellite $10_i$ and GPS receiver 22 or 32)=(carrier wave wavelength L)×(phase integrated value).

$$\Phi^{jh}_{ku} = \left[\left\{\sqrt{(X_k(t)-X_j(t))^2+(Y_k(t)-Y_j(t))^2+(Z_k(t)-Z_j(t))^2} - \sqrt{(X_u(t)-X_j(t))^2+(Y_u(t)-Y_j(t))^2+(Z_u(t)-Z_j(t))^2}\right\} - \left\{\sqrt{(X_k(t)-X_h(t))^2+(Y_k(t)-Y_h(t))^2+(Z_k(t)-Z_h(t))^2} - \sqrt{(X_u(t)-X_h(t))^2+(Y_u(t)-Y_h(t))^2+(Z_u(t)-Z_h(t))^2}\right\}\right] \Big/ L + N^{jh}_{ku} + \varepsilon^{jh}_{ku}$$

Equation (6)

Here, the term $[X_k(t), Y_k(t), Z_k(t)]$ in equation (6) represents the coordinate values in a world coordinate system of the reference vehicle 20 at time t, the term $[X_u(t), Y_u(t), Z_u(t)]$ represents the coordinate values (unknown) of the non-reference vehicle 30 at time t, and the terms $[X_j(t), Y_j(t), Z_j(t)]$ and $[X_h(t), Y_h(t), Z_h(t)]$ represent the coordinate values of each GPS satellite $10_j$ and $10_h$ at time t. $N^{jh}_{ku}$ is the double phase difference of the integral value bias (namely, $N^{jh}_{ku}=(N_{jk}-N_{ju})-(N_{hk}-N_{hu})$). Furthermore, time t is synchronized to, for example, GPS time.

In addition, the double phase difference of the pseudo distance relating to two GPS satellites $10_j$ and $10_k$ (i=j, h provided that j≠h) at time t is represented by equation (7).

$$\rho^{jh}_{ku}=(\rho_{jk}(t)-\rho_{ju}(t))-(\rho_{hk}(t)-\rho_{hu}(t))$$

Equation (7)

The double phase difference $\rho^{jk}_{ku}$ can be expressed as shown in equation (8).

$$\rho^{jh}_{ku} = \left\{\sqrt{(X_k(t)-X_j(t))^2+(Y_k(t)-Y_j(t))^2+(Z_k(t)-Z_j(t))^2} - \sqrt{(X_u(t)-X_j(t))^2+(Y_u(t)-Y_j(t))^2+(Z_u(t)-Z_j(t))^2}\right\} - \left\{\sqrt{(X_k(t)-X_h(t))^2+(Y_k(t)-Y_h(t))^2+(Z_k(t)-Z_h(t))^2} - \sqrt{(X_u(t)-X_h(t))^2+(Y_u(t)-Y_h(t))^2+(Z_u(t)-Z_h(t))^2}\right\}$$

Equation (8)

Here, the terms $[X_k(t), Y_k(t), Z_k(t)]$, $[X_u(t), Y_u(t), Z_u(t)]$, $[X_j(t), Z_j(t)]$ and $[X_h(t), Y_h(t), Z_h(t)]$ in equation (8) are the same as defined for equation (6). In addition, time t is synchronized to, for example, GPS time.

The relationship between observed quantity Z and state variable ρ is represented with the linear model of equation (9).

$$Z=H(i)\cdot\eta+V|$$

Equation (9)

Here, V indicates the monitoring noise. η represents the state variable, and is the double phase difference of the coordinate value (unknown) and integral value bias of the non-reference vehicle 30. For example, in the case a pair (j,h) of GPS satellites 10 for which bearings have been obtained consists of the four sets of (1, 2), (1, 3), (1, 4) and (1, 5), then $\eta=[X_u, Y_u, Z_u, N^{12}_{ku}, N^{13}_{ku}, N^{14}_{ku}, N^{15}_{ku}]^T$ (where T represents the transposition). The observed quantity Z in equation (9) is the double phase difference $\Phi^{jh}_{ku}$ of the phase integrated value (refer to equation (5) above) and the double phase difference $\rho^{jh}_{ku}$ of the pseudo distance (see equation (7) above). For example, in the case of a pair (j,h) of GPS satellites 10 for which bearings have been obtained consists of the four sets of (1, 2), (1, 3), (1, 4) and (1, 5), then $Z=[\Phi^{12}_{ku}, \Phi^{13}_{ku}, \Phi^{14}_{ku}, \Phi^{15}_{ku}, \rho^{12}_{ku}, \rho^{13}_{ku}, \rho^{14}_{ku}, \rho^{15}_{ku}]^T$. Although the monitoring equation of equation (9) above is linear, in equations (6) and (8), since the observed quantity Z is non-linear with respect to state variables $X_u, Y_u$ and $Z_u$, each term of equations (6) and (8) is partially differentiated by state variables $X_u, Y_u$ and $Z_u$, respectively, and the observed matrix is determined in equation (9) above. For example, in the case of a pair (j,h) of GPS satellites 10 for which bearings have been obtained consists of the four sets of (1, 2), (1, 3), (1, 4) and (1, 5), the observed matrix H is as shown in equation (10) below in the following manner.

$$H = \begin{bmatrix} H_1 \\ H_2 \end{bmatrix} = \begin{bmatrix} \frac{\partial Z_{1ku}^{12}}{\partial x_u} & \frac{\partial Z_{1ku}^{12}}{\partial y_u} & \frac{\partial Z_{1ku}^{12}}{\partial z_u} & 1 & & & \\ \cdot & \cdot & \cdot & & 1 & & \\ \cdot & \cdot & \cdot & & & 1 & \\ \frac{\partial Z_{1ku}^{15}}{\partial x_u} & \frac{\partial Z_{1ku}^{15}}{\partial y_u} & \frac{\partial Z_{1ku}^{15}}{\partial z_u} & & & & 1 \\ \frac{\partial Z_{2ku}^{12}}{\partial x_u} & \frac{\partial Z_{2ku}^{12}}{\partial y_u} & \frac{\partial Z_{2ku}^{12}}{\partial z_u} & & & & \\ \cdot & \cdot & \cdot & & & 0 & \\ \cdot & \cdot & \cdot & & & & \\ \frac{\partial Z_{2ku}^{15}}{\partial x_u} & \frac{\partial Z_{2ku}^{15}}{\partial y_u} & \frac{\partial Z_{2ku}^{15}}{\partial z_u} & & & & \end{bmatrix}$$

Equation (10)

Here, $H_1$ in equation (10) is the observed matrix in the case the observed quantity $Z_1=[\Phi^{12}_{ku}, \Phi^{13}_{ku}, \Phi^{14}_{ku}, \Phi^{15}_{ku}]^T$, while $H_2$ in equation (10) is the observed matrix in the case the observed quantity $Z_2=[\rho^{12}_{ku}, \rho^{13}_{ku}, \rho^{14}_{ku}, \rho^{15}_{ku}]^T$, and the observed matrix H is of a form that incorporates these two observed matrices $H_1$ and $H_2$.

When equation (9) is solved by the least squares method using the observed matrix H of equation (3), a real solution (floating solution) of η is obtained as shown in equation (11) below.

$$\eta=(H^T\cdot H)^{-1}\cdot H^T\cdot Z|$$

Equation (11)

Furthermore, since the relative position of the non-reference vehicle 30 relative to the reference vehicle 20 is important, the coordinate values $[X_u(t), Y_u(t), Z_u(t)]$ of the reference vehicle 20 used to derive this real solution may be, for example, values of the results of independent positioning sent together with monitoring data from the reference vehicle 20.

In the integer solution calculation unit 46, an integer solution for integral value bias is calculated based on the real solution (floating solution) of integral value bias calculated with the real solution calculation unit 44. For example, an integer solution (namely, wave number) having the smallest error with respect to the real solution calculated with the real solution calculation unit 44 is determined as a first candidate, and an integer solution having the next smallest error is determined as a second candidate. The LAMBDA method may be used for this technique, which specifies a solution by narrowing the search space of the integer solution, in order to eliminate any correlation with integral value bias. Alternatively, the integer solution may also be derived using another integer least squares method or simple rounding instead of the LAMBDA method.

In the FIX determination unit 48, a determination is made as to whether or not the integer solution derived with the integer solution calculation unit 46 is to be used as a FIX solution. Namely, a determination is made of the reliability of the integer solution derived with the integer solution calculation unit 46, and in the case a highly reliable integer solution is obtained, that integer solution is used as FIX and positioning results are subsequently output according to real time kinematic (RTK) positioning using that integer solution. At this time, the relative position of the non-reference vehicle 30 relative to the reference vehicle 20 is output as a positioning result. This positioning result (relative position of the non-reference vehicle 30 relative to the reference vehicle 20) is transmitted to the reference vehicle 20 and another non-reference vehicle 30 by the positioning result transmission unit 42, and is used in the reference vehicle 20 and the other non-reference vehicle 30 as well.

Furthermore, there are various methods for determining the reliability of the integer solution, and any suitable method may be used. For example, reliability of the integer solution may be determined by applying a ratio test. As one example of a ratio test, a case is assumed in which a pair (j,h) of GPS satellites 10 for which bearings have been obtained consists of the four sets of (1, 2), (1, 3), (1, 4) and (1, 5), and four integral bias real solutions ($n^{12}, n^{13}, n^{14}, n^{15}$), first candidates ($N^{12}_1, N^{13}_1, N^{14}_1, N^{15}_1$) of an integer solution of the integral value bias, and second candidates ($N^{12}_2, N^{13}_2, N^{14}_2, N^{15}_2$) of an integer solution of the integral value bias each are calculated. At this time, as indicated in equation (12) below, the ratio R is the ratio of the distance (norm) between the real solution of integral value bias and the first candidate of the integer solution of integral value bias, and the distance between the real solution of integral value bias and the second candidate of the integer solution of integral value bias.

$$R = \{(n^{12}-N^{12}_2)^2 + (n^{13}-N^{13}_2)^2 + (n^{14}-N^{14}_2)^2 + (n^{15}-N^{15}_2)^2\} / \{(n^{12}-N^{12}_1)^2 + (n^{13}-N^{13}_1)^2 + (n^{14}-N^{14}_1)^2 + (n^{15}-N^{15}_1)^2\}$$

Equation (12)

In general, the reliability of the first candidate of the integer solution of integral value bias is higher the higher the value of the ratio R. Thus, in the case of setting a suitable prescribed threshold a and the ratio R is larger than this prescribed threshold a, the reliability of the integer solution is determined to be high, and the first candidate of the integer solution of integral value bias may be used.

Figure 4:
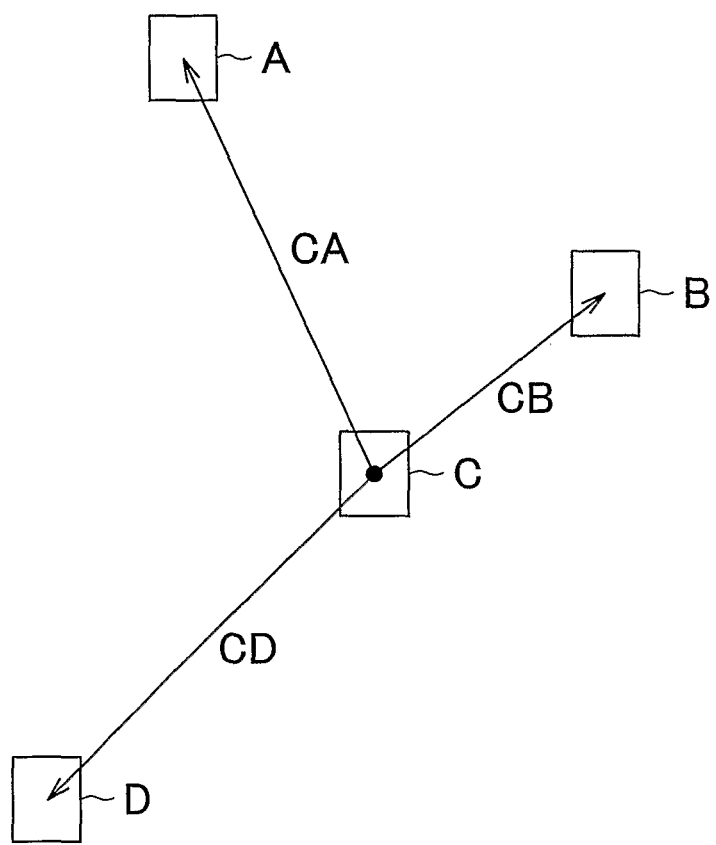
FIG. 4 is an explanatory drawing of the basic concept in the inter-moving body interferometric positioning system of the embodiment.

Next, an explanation is provided of the basic concept of the inter-moving body interferometric positioning system of this embodiment with reference to FIG. 4.

FIG. 4 is a drawing conceptually showing the state in which is present a group of vehicles composed of four vehicles A, B, C and D requiring mutual determination of their relative positions as an example of the system of this embodiment. In this embodiment, a single specific vehicle is decided to be a reference vehicle in a group of vehicles consisting of three or more vehicles. Although the manner used to decide on the reference vehicle is arbitrary, the following provides a description of a method used. Here, vehicle C is decided to be the reference vehicle. In this case, the vehicle C realizes the function of the previously mentioned reference vehicle 20, while the other vehicles A, B and D realize the function of the previously mentioned non-reference vehicle 30. More specifically, as was previously described with reference to FIG. 3, the vehicle C transmits (broadcasts) monitoring data monitored with the vehicle C to the other vehicles A, B and D. In each of the other vehicles A, B and D, the relative position of their own vehicle relative to the vehicle C is determined using the monitoring data from the vehicle C and their own monitoring data. In each of the other vehicles A, B and D, their own positioning results are transmitted (broadcast) to all of the other vehicles (including the vehicle C). As a result, the position of the vehicle A relative to the vehicle C (namely, vector CA), the position of the vehicle B relative to the vehicle C (namely, vector CB) and the position of the vehicle D relative to the vehicle C (namely, vector CD) can be determined by all of the vehicles A, B, C and D. Thus, in the vehicle D, for example, in order to determine the relative position of the vehicle A, for example, the relative position between the vehicle A and the vehicle D is derived using the vector CA determined with the vehicle A and the vector CD determined by its own vehicle.

Here, in order to explain the usefulness of the inter-moving body interferometric positioning system according to this embodiment, a comparison is made with a system used as a comparative example in which interferometric positioning between each vehicle is carried out unsystematically. In a system in which interferometric positioning among vehicles is carried out unsystematically, in the vehicle A under the circumstances shown in FIG. 4, for example, it is necessary to determine relative position relative to each of the vehicles B, C and D by receiving monitoring data from each vehicle. In contrast, in the inter-moving body interferometric positioning system according to this embodiment, the vehicle A is only required to receive monitoring data from the vehicle C only and only determine relative position relative to the vehicle C by interferometric positioning, thereby considerably reducing the calculation load and communication load. Furthermore, with respect to communication load, although it is necessary in the inter-moving body interferometric positioning system according to this embodiment for the vehicle A, for example, to transmit (broadcast) its own positioning results to the other vehicles and receive positioning results from the other vehicles, since it is not necessary to receive large amounts of monitoring data from the vehicles B and D, the overall communication load is reduced.

In addition, in a system in which interferometric positioning between each vehicle is carried out unsystematically, in the vehicle A, for example, although the relationship of the relative positions of the vehicles B and C, for example, is determined based on the vehicle A, in the vehicle D, the relationship of the relative positions of the vehicles B and C is determined based on the vehicle D. As a result, there are cases in which the relationship of the relative positions of the vehicles B and C may be determined differently between the vehicle A and the vehicle D due to the vehicle serving as a reference being different between the vehicle A and the vehicle D (namely, it may not be possible to achieve conformity when determining relative positions between vehicles). In contrast, according to this embodiment, since the relationship of the relative positions of the vehicles B and C, for example, is determined based on the vehicle C in the vehicle A, for example, and the relationship of the relative positions of the vehicles B and C is also determined based on the vehicle C in the vehicle D, the vehicle C is common to both the vehicles A and D, thereby preventing the occurrence of the relationship of the relative positions of the vehicles B and C being determined differently between the vehicles A and D.

In this manner, calculation load and communication load can be reduced in an extremely efficient manner according to this embodiment in contrast with a system in which interferometric positioning between each vehicle is carried out unsystematically, and since there is only one reference vehicle, relative positions between vehicles can be determined while maintaining conformity between vehicles.

Furthermore, although the example shown in FIG. 4 specifies the relative position between each vehicle in a group of vehicles composed of four vehicles, the process is the same between each vehicle for a group of vehicles consisting of three vehicles or five vehicles or more. In addition, in the case of being composed of two or more groups of vehicles, a single reference vehicle is decided on within each group. In addition, a certain vehicle may belong to two or more groups of vehicles. In addition, in the example shown in FIG. 4, for example, although it is not particularly necessary for the vehicle B, for example, to determine relative position with the other vehicles, it may belong to the group of vehicles in order to coordinate with the other vehicles.

Next, an explanation is provided of several examples of algorithms for deciding on a reference vehicle in an example of an inter-moving body interferometric positioning system according to this embodiment. In the following description, the explanations are provided in correlation with the situation shown in FIG. 4 to facilitate understanding, and the vehicle A is explained as a host vehicle as a general rule.

Figure 5:
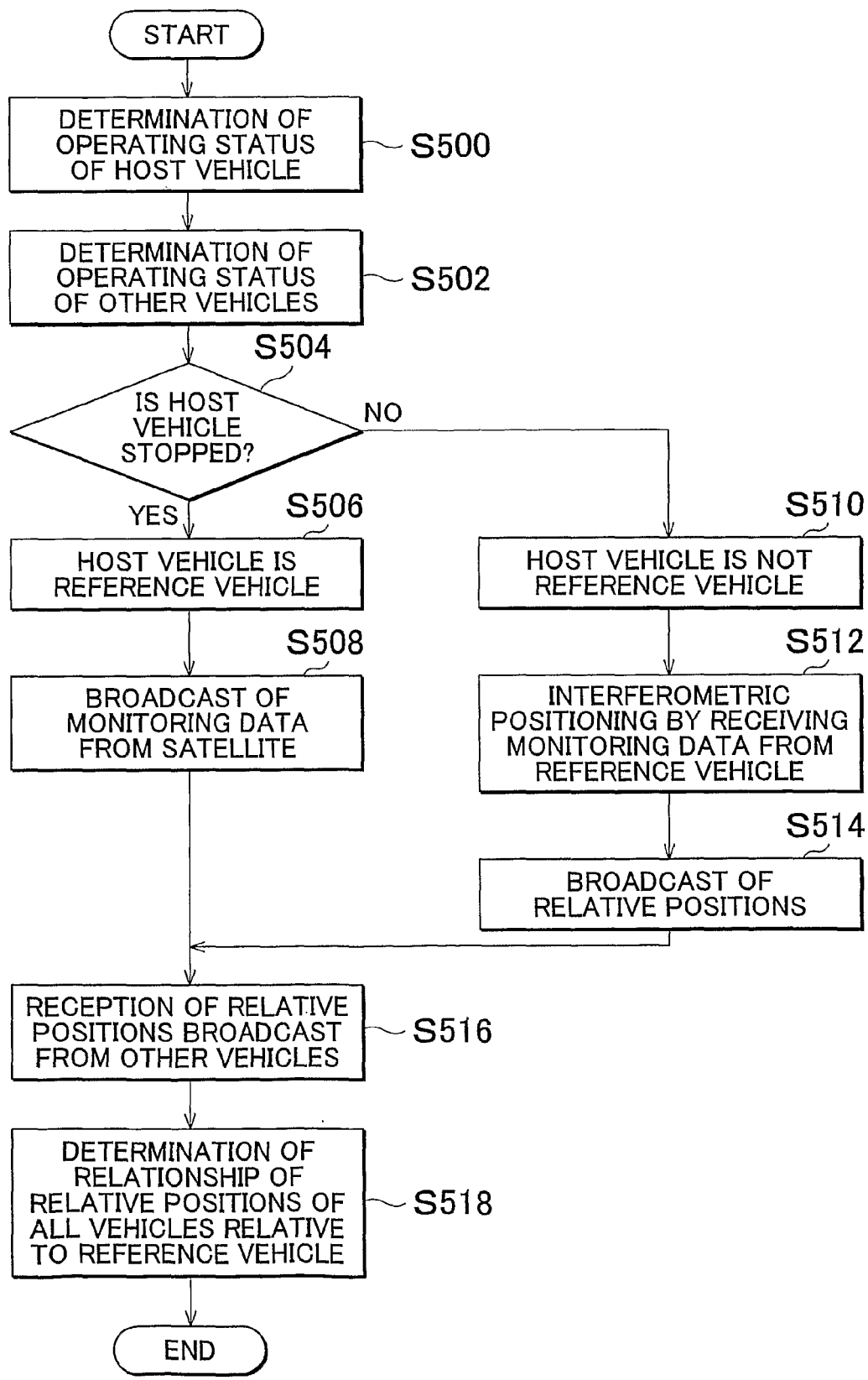
FIG. 5 is a flow chart showing a first example of an inter-moving body interferometric positioning system according to the embodiment.

FIG. 5 is a flow chart showing a first example of an inter-moving body interferometric positioning system according to this embodiment. Although the processing routine shown in FIG. 5 is explained as that which is executed in the vehicle A, it is also executed in parallel in the other vehicles B, C and D as well. Namely, the processing routine shown in FIG. 5 is repeated by synchronizing to a fixed sampling time (using GPS time or pulse-per-second (PPS) signals, for example) in each of the vehicles. Furthermore, in each of the vehicles, the GPS receiver 22 or 32 and the vehicle-to-vehicle communication device 24 or 34 of each vehicle executes this processing routine by functioning as an inter-moving body interferometric positioning device.

In step 500, the operating status of a host vehicle (vehicle A) is determined from a vehicle sensor of a host vehicle. Furthermore, the operating status of the host vehicle may be determined from a vehicle speed sensor of the host vehicle, may be determined from the rotating speed and the like of the output shaft of the transmission of the host vehicle, or may be determined from a record of independent positioning results of the position of the host vehicle. Furthermore, the operating status of the host vehicle may also be broadcast to other vehicles in the vicinity (other vehicles B, C and D) as necessary for use in the other vehicles (refer to step 502 described below).

In step 502, the operating status of other vehicles is determined. The operating status of other vehicles may be determined on the basis of data broadcast from the other vehicles (vehicles B, C and D) in correlation with the above-mentioned step 500, or may be determined by subtracting the operating status of the host vehicle from the relationship of relative positions until the previous positioning cycle.

In step 504, a determination is made as to whether or not a stopped vehicle is a host vehicle based on the information obtained in the steps 500 and 502. In the case a stopped vehicle is a host vehicle, processing proceeds to step 506, while in the case the stopped vehicle is not a host vehicle, processing proceeds to step 510.

In step 506, it is determined that the stopped host vehicle should function as a reference vehicle, and the host vehicle becomes the reference vehicle. Furthermore, in the case of the existence of a vehicle other than the host vehicle that satisfies the requirement of the step 504, the reference vehicle may be decided by another method, such as deciding the vehicle that was the reference vehicle in the previous positioning cycle to continue to be the reference vehicle. Furthermore, such rules for deciding the reference vehicle (applied similarly in subsequent explanations) are shared by each vehicle so that the number of reference vehicles does not become two or more.

In step 508, monitoring data monitored with the host vehicle is broadcast to other vehicles in the vicinity (the other vehicles B, C and D). In this case, it is not necessary for the previously described interferometric positioning processing to be carried out in the host vehicle.

In step 510, it is determined that the host vehicle that is not stopped should not function as the reference vehicle. In this case, another vehicle that is stopped (such as either of the other vehicles B, C and D) becomes the reference vehicle. Furthermore, in the case a stopped vehicle is not present in the current positioning cycle, the reference vehicle may be decided on by another method, such as deciding the vehicle that was the reference vehicle in the previous positioning cycle to continue to be the reference vehicle.

In step 512, monitoring data is received from the reference vehicle, and interferometric positioning is executed as described above.

In step 514, the interferometric positioning result obtained in the step 512 (namely, the relative position of a host vehicle relative to the reference vehicle) is broadcast to the other vehicles in the vicinity (the other vehicles B, C and D).

In step 516, relative positions broadcast from the other vehicles (refer to step 514) are received. Namely, in the case the host vehicle is the reference vehicle, the interferometric positioning results of the other vehicles in the vicinity (the other vehicles B, C and D) (namely, the respective relative positions of the other vehicles B, C and D relative to the host vehicle) are received. In the case the host vehicle is a non-reference vehicle, interferometric positioning results of other vehicles in the vicinity except for the reference vehicle are received.

In step 518, the relationship of the respective relative positions of the host vehicle and the other vehicles in the vicinity relative to the reference vehicle is determined based on the interferometric positioning results received in the step 516 (and on the positioning results of the host vehicle of step 512 in the case the host vehicle is a non-reference vehicle). In addition, the relationship of the relative positions between non-reference vehicles is also determined based on the relationship of the respective relative positions of the other vehicles in the vicinity relative to the reference vehicle as necessary.

According to the processing shown in FIG. 5 as described above, the relative positions of other vehicles are determined by interferometric positioning by using a stopped vehicle as the reference vehicle. For a example, a vehicle stopped at an intersection and the like functions as the reference vehicle. As a result, since a vehicle having a fixed position can be used for the reference vehicle, interferometric positioning can be realized in the same manner as ordinary RTK positioning that uses a base station having a fixed position. As a result, integral values obtained by interferometric positioning computations can be fixed easily, relative positions can be determined with high precision, and the positional relationship of all other vehicles in the vicinity can be accurately determined by means of the reference vehicle.

Figure 6:
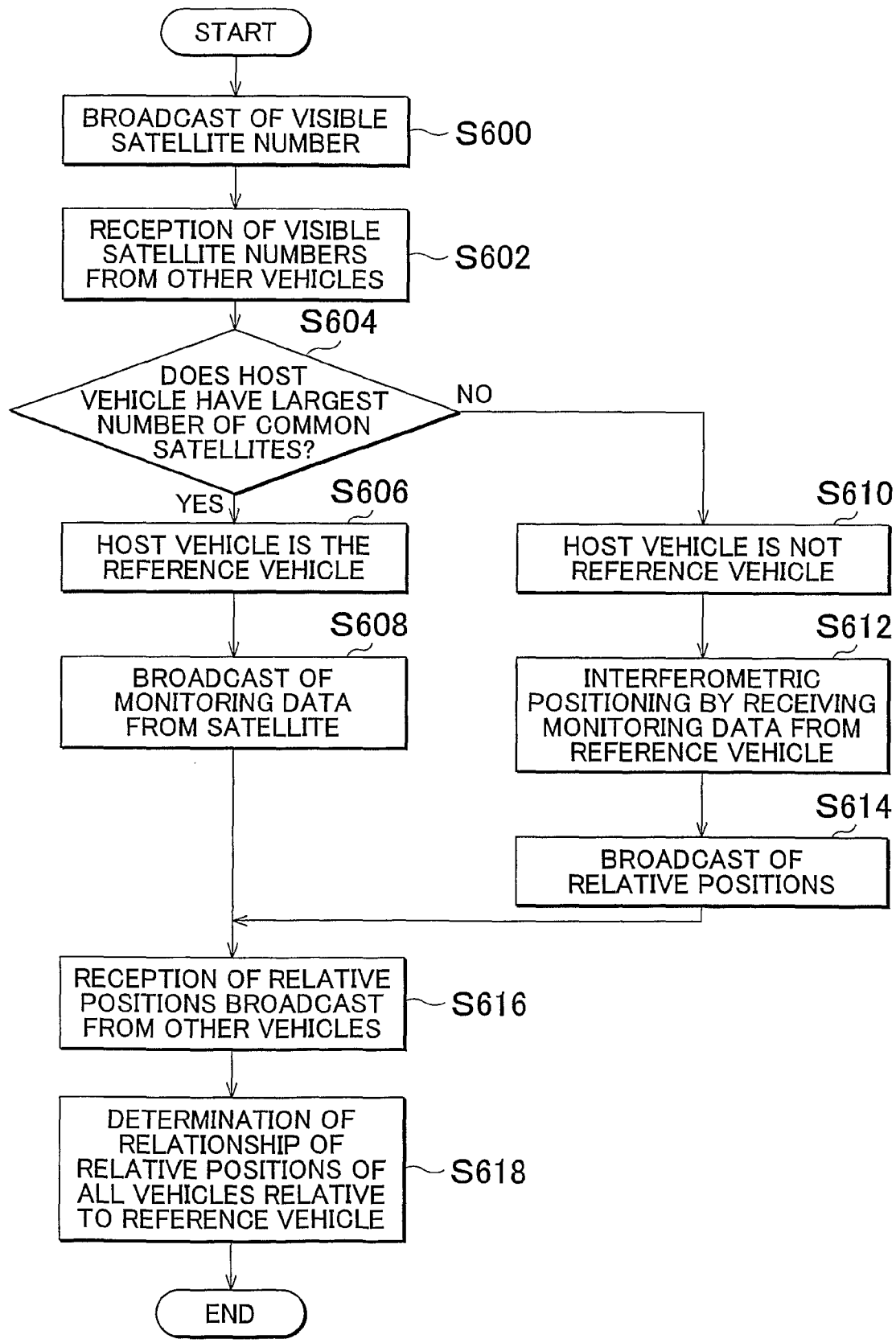
FIG. 6 is a flow chart showing a second example of an inter-moving body interferometric positioning system according to the embodiment.

FIG. 6 is a flow chart showing a second example of an inter-moving body interferometric positioning system according to this embodiment. Although the processing routine shown in FIG. 6 is explained as being executed in the vehicle A, it is also executed in parallel in the other vehicles B, C and D. Namely, the processing routine shown in FIG. 6 is repeatedly executed at intervals by synchronizing to a fixed sampling time (using GPS time or PPS signals, for example) in each of the vehicles. The GPS receiver 22 or 32 and the vehicle-to-vehicle communication device 24 or 34 of each vehicle executes this processing routine by functioning as an inter-moving body interferometric positioning device.

In step 600, a satellite number of a GPS satellite 10 able to be monitored in the host vehicle (visible satellite) is broadcast to other vehicles in the vicinity (other vehicles B, C and D). Furthermore, the GPS satellite 10 able to be monitored may be defined as a GPS satellite 10 capable of receiving radio waves at a prescribed reception intensity or greater.

In step 602, a satellite number of a GPS satellite 10 able to be monitored in the other vehicles is determined. The satellite number of the GPS satellite 10 able to be monitored in the other vehicles may also be determined based on data broadcast from the other vehicles (the other vehicles B, C and D) in correlation with the previously described step 600.

In step 604, when it has been assumed that the host vehicle is the reference vehicle, a determination is made as to whether or not the host vehicle has at least the minimum number of common satellites required for positioning in the relationships with each of the other vehicles in the vicinity (the other vehicles B, C and D), and whether or not the number of common satellites in each of the relationships with the other vehicles in the vicinity is the largest when the host vehicle is assumed to be the reference vehicle. Here, a common satellite refers to a GPS satellite 10 able to be monitored in both the host vehicle and in the other vehicles. In a configuration in which positioning is carried out using a typical reference satellite, the minimum number of common satellites required for positioning is 5. For example, in the case the host vehicle A has 5, 6 and 7 common satellites with respect to the other vehicles, B, C and D, respectively, and the total thereof (18) is greater than the same total number when another vehicle has been assumed to be the reference vehicle, a positive determination is made in this step 604. In the case a positive determination is made in this step 604, processing proceeds to step 606, while in the case a negative determination is made, processing proceeds to step 610.

In step 606, it is determined that the host vehicle should function as the reference vehicle, and the host vehicle becomes the reference vehicle.

In step 608, monitoring data monitored with the host vehicle is broadcast to the other vehicles in the vicinity (the other vehicles B, C and D). In this case, the previously described interferometric positioning processing is not required to be carried out in the host vehicle.

In step 610, it is determined that the host vehicle should not function as the reference vehicle. In this case, another vehicle that satisfies the requirement of step 604 described above (any of the other vehicles B, C and D) becomes the reference vehicle.

In step 612, monitoring data is received from the reference vehicle and interferometric positioning processing is executed as previously described.

In step 614, interferometric positioning result obtained in the step 612 (namely, the relative position of the host vehicle relative to the reference vehicle) is broadcast to the other vehicles in the vicinity (the other vehicles B, C and D).

In step 616, the relative positions broadcast from the other vehicles (refer to step 614) are received. Namely, in the case the host vehicle is the reference vehicle, the interferometric positioning results of the other vehicles in the vicinity (the other vehicles B, C and D) (namely, the respective relative positions of the other vehicles B, C and D relative to the host vehicle) are received. In the case the host vehicle is a non-reference vehicle, interferometric positioning results of the other vehicles except for the reference vehicle are received.

In step 618, the relationship of the respective relative positions of the host vehicle and the other vehicles in the vicinity relative to the reference vehicle is determined based on the interferometric positioning results received in the step 616 (and the positioning result of the host vehicle in the case the host vehicle is a non-reference vehicle). In addition, the relationship of the relative positions between non-reference vehicles is also determined based on the relationship of the respective relative positions of the other vehicles in the vicinity relative to the reference vehicle as necessary.

According to the processing shown in FIG. 6 as described above, the vehicle for which the number of common satellites in the relationship with other vehicles in the vicinity is equal to or greater than the minimum number of satellites required for positioning and for which the number of common satellites in the relationship with other vehicles in the vicinity is the largest is decided to be the reference vehicle, the relative positions of the other vehicles relative to that reference vehicle is determined by interferometric positioning. As a result, the relative positions among all vehicles can be determined, and since the vehicle having the largest number of common satellites can be used as the reference vehicle, highly precise interferometric positioning can be realized. As a result, relative position can be determined with high precision and the relative positions of all other vehicles in the vicinity can be accurately determined by means of the reference vehicle.

Figure 7:
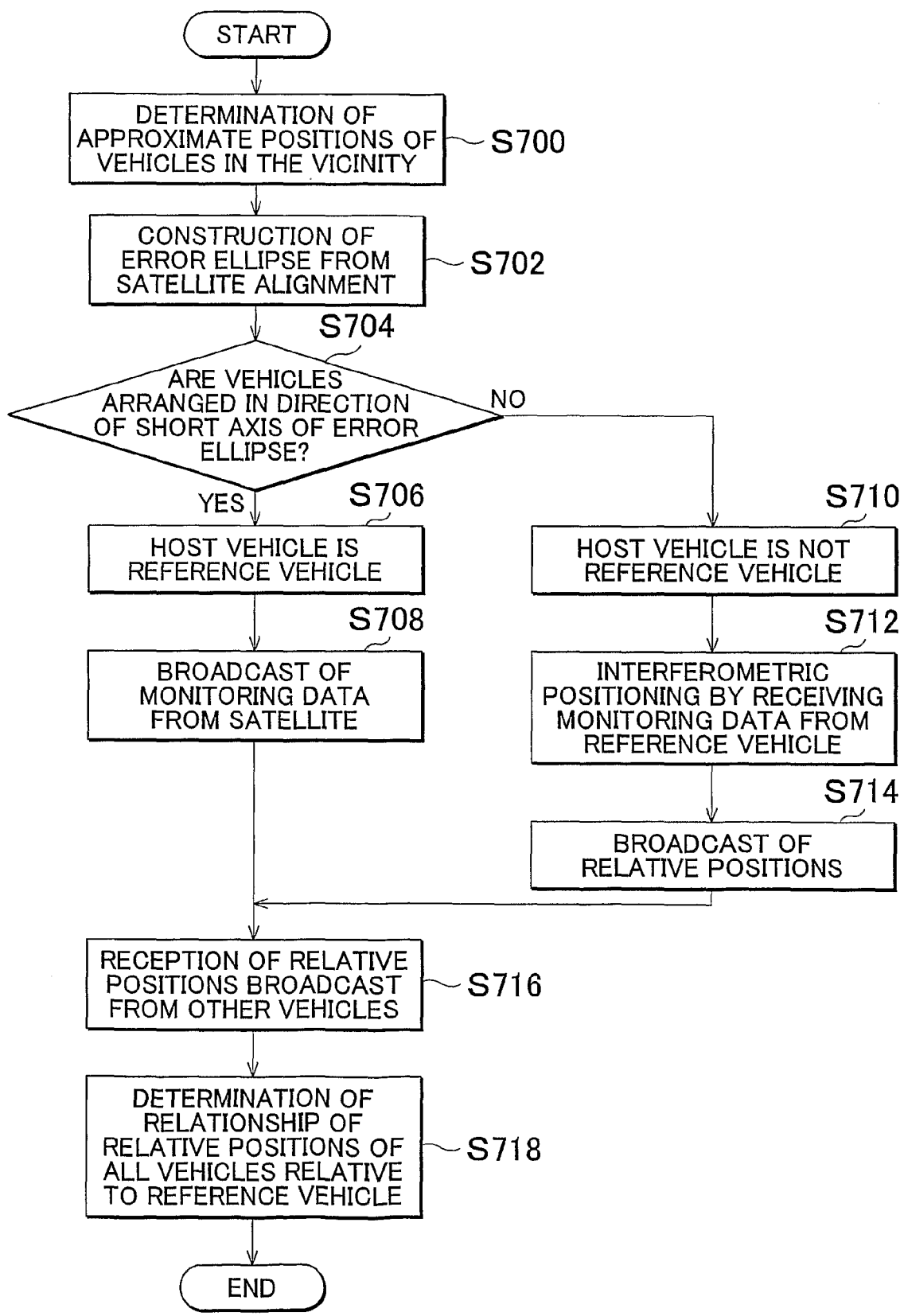
FIG. 7 is a flow chart showing a third example of an inter-moving body interferometric positioning system according to the embodiment.

FIG. 7 is a flow chart showing a third example of an inter-moving body interferometric positioning system according to this embodiment. Although the processing routine shown in FIG. 7 is explained as being executed in the vehicle A, it is also executed in parallel in the other vehicles B, C and D. Namely, the processing routine shown in FIG. 7 is repeatedly executed at intervals by synchronizing to a fixed sampling time (using GPS time or PPS signals, for example) in each of the vehicles. The GPS receiver 22 or 32 and the vehicle-to-vehicle communication device 24 or 34 of each vehicle executes this processing routine by functioning as an inter-moving body interferometric positioning device.

In step 700, the approximate positions of other vehicles in the vicinity (other vehicles B, C and D) are determined. The approximate positions of the other vehicles in the vicinity may be determined based on the interferometric positioning results (relationship of the relative positions) of the previously positioning cycle, or may be determined based on data broadcast from the other vehicles (C/A data and an independent positioning results of each vehicle).

In step 702, an error ellipse is constructed from the current satellite alignment. Satellite alignment may be the satellite alignment with respect to all GPS satellites 10 able to be monitored with the host vehicle, or the satellite alignment with respect to GPS satellites 10 serving as common satellites in the relationships between each of the other vehicles in the vicinity (the other vehicles B, C and D) when the host vehicle has been assumed to be the reference vehicle. In this case, in the case the common satellites differ in the relationships between each of the other vehicles in the vicinity, an error ellipse may be constructed for each common satellite. There are various methods for constructing in error ellipse, and any suitable method may be used. For example, when the true two-dimensional position of the host vehicle is defined as $(x(t), y(t))$ and the same two-dimensional position of the host vehicle based on independent positioning results is defined as (x'(t), y'(t)), then positioning error ΔP(t) can be expressed with equation (13) below.

$$\Delta P(t) = \begin{pmatrix} x - x' \\ y - y' \end{pmatrix}$$ Equation (13)

The covariance matrix of positioning error becomes as shown in equation (14) below.

$$\sum P(t) = E(\Delta P(t) \cdot \Delta P(t)^T) = \begin{bmatrix} \sigma_x(t)^2 & \sigma_{xy}(t) \\ \sigma_{xy}(t) & \sigma_y(t)^2 \end{bmatrix}$$ Equation (14)

At this time, error ellipse can be expressed with equation (15) as shown below.

$$(x - x', y - y') \begin{pmatrix} \sigma_x^2 & \sigma_{xy} \\ \sigma_{xy} & \sigma_y^2 \end{pmatrix} \begin{pmatrix} x - x' \\ y - y' \end{pmatrix} \le D^2$$ Equation (15)

This indicates the region serving as the Mahalanobis distance D, and is an ellipse having (x', y') at the center thereof. Here, the term, 2σxy(x−x')(y−y'), obtained by expanding the left side of the equation represents the rotation of the ellipse and is used to specify the direction of the short axis of the error ellipse. Furthermore, error ellipse may also be calculated using a method like that disclosed in, for example, Japanese Patent Application Publication No. 2002-328157 (JP-A-2002-328157).

Figure 8:
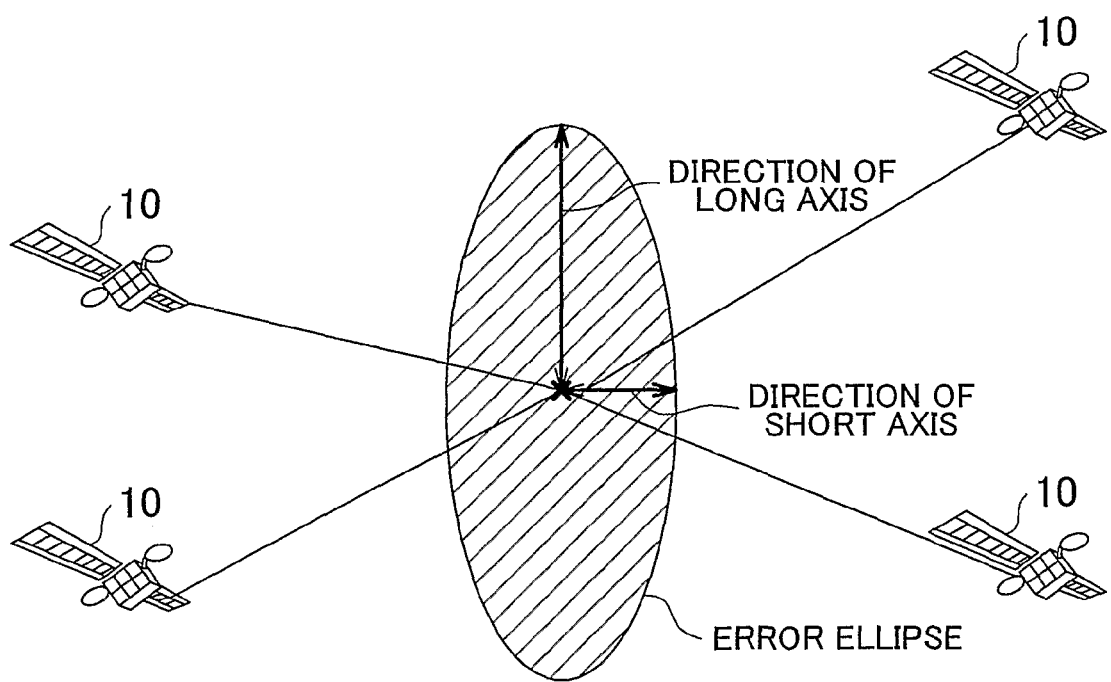
FIG. 8 is a drawing conceptually showing an example of the relationship between error ellipse and satellite alignment when viewed from the zenith.

Here, as conceptually shown in FIG. 8, error ellipse based on satellite alignment is a longitudinally long ellipse when the satellite alignment is long horizontally, and there is less likelihood of the occurrence of error in the direction of the short axis than in the direction of the long axis. Thus, carrying out interferometric positioning by using a pair of vehicles arranged along the direction of the short axis can be seen to improve positioning accuracy rather than carrying out interferometric positioning by using a pair of vehicles arranged in the direction along the long axis.

Returning to FIG. 7, in step 704, a determination is made as to whether or not the host vehicle is arranged in the direction of the short axis of the error ellipse in the relationships with the other vehicles in the vicinity (the other vehicles B, C and D). Furthermore, being arranged in the direction of the short axis does not necessarily mean being arranged on a straight line in the direction of the short axis, but rather the case in which, for example, offset in the direction of the long axis is smaller than a prescribed value can also be considered as being arranged in the direction of the short axis. For example, in a situation like that shown in FIG. 9 (differing from the situation shown in FIG. 4), in the case the host vehicle (vehicle A) is arranged in the direction of the short axis of an error ellipse together with other vehicles B and D, a positive determination is made in this step 704. In the case a positive determination is made in this step 704, processing proceeds to step 706, while in the case a negative determination is made, processing proceeds to step 708.

In step 706, it is determined that the host vehicle should function as the reference vehicle and the host vehicle becomes the reference vehicle. Here, in the case of the existence of a vehicle other than the host vehicle that satisfies the requirement of the step 704, the reference vehicle may be decided by another method, such as deciding the vehicle that was the reference vehicle in the previous positioning cycle to continue to be the reference vehicle. Alternatively, in each vehicle that satisfies the requirement of the step 704 offset in the direction of the long axis with respect to the host vehicle GPS may be totaled for each of the other vehicles in the vicinity, and the vehicle having the smallest total value may be made to be the reference vehicle.

In step 708, monitoring data monitored with the host vehicle is broadcast to the other vehicles in the vicinity (the other vehicles B, C and D). In this case, the interferometric positioning processing described above is not required to be carried out in the host vehicle.

In step 710, it is determined that the host vehicle should not function as the reference vehicle. In this case, another vehicle that satisfies the requirement of the step 704 (either of the other vehicles B, C and D) becomes the reference vehicle. Furthermore, in the case a vehicle that satisfies the requirement of step 704 is not present in the current positioning cycle, the reference vehicle may be decided on by another method, such as deciding the vehicle that was the reference vehicle in the previous positioning cycle to continue to be the reference vehicle.

In step 712, monitoring data is received from the reference vehicle, and interferometric positioning processing is executed in the manner described above.

In step 714, the interferometric positioning result obtained in step 712 above (namely, the relative position of the host vehicle relative to the reference vehicle) is broadcast to the other vehicles in the vicinity (the other vehicles B, C and D).

In step 716, relative positions broadcast from the other vehicles (refer to step 714) are received. Namely, in the case the host vehicle is the reference vehicle, the interferometric positioning results of the other vehicles in the vicinity (the other vehicles B, C and D) (namely, the respective relative positions of the other vehicles B, C and D relative to the host vehicle) are received. In the case the host vehicle is a non-reference vehicle, interferometric positioning results of the other vehicles in the vicinity except for the reference vehicle are received.

In step 718, the relationship of the respective relative positions of the host vehicle and the other vehicles in the vicinity relative to the reference vehicle is determined based on the interferometric positioning results received in the step 716 (and on the positioning results of the host vehicle in the case the host vehicle is a non-reference vehicle). In addition, the relationship of the relative positions between non-reference vehicles is also determined based on the relationship of the respective relative positions of the other vehicles in the vicinity relative to the reference vehicle as necessary.

According to the processing shown in FIG. 7 as described above, an error ellipse is determined from satellite alignment, any of the vehicles arranged in the direction of the short axis of the error ellipse is decided to be the reference vehicle, and the relative positions of other vehicles relative to that reference vehicle are determined by interferometric positioning. As a result, since a vehicle in the direction of the short axis for which there is less likelihood of error can be used for the reference vehicle, highly precise interferometric positioning can be realized. As a result, highly precise relative positions can be determined and the relative positions of all other vehicles in the vicinity can be accurately determined by means of the reference vehicle.

Figure 9:
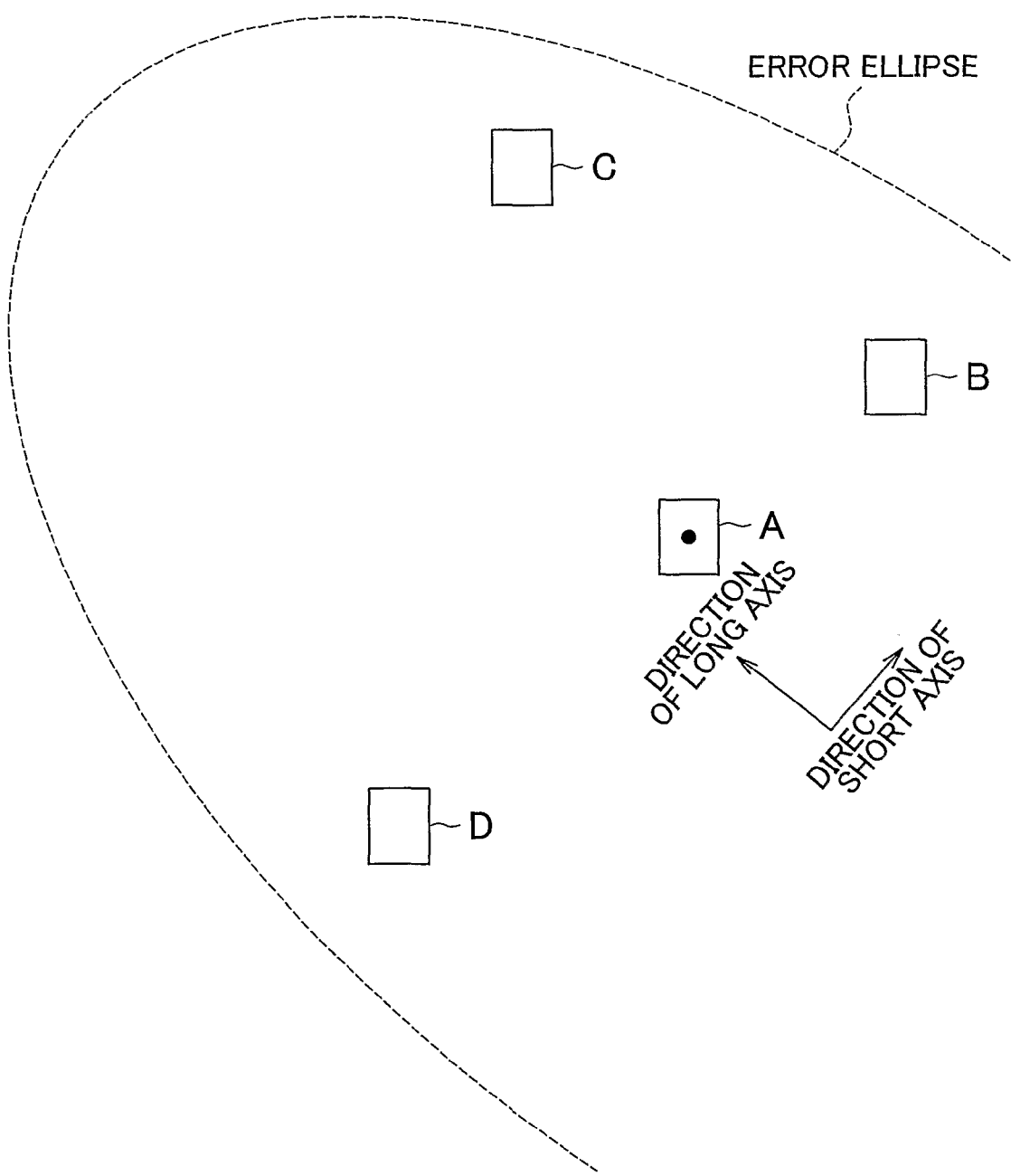
FIG. 9 is a drawing conceptually showing an example of the relationship between error ellipse and the decision aspect of a reference vehicle.

Furthermore, according to the processing shown in FIG. 7, any of the vehicles A, B and D can be decided to be the reference vehicle under the circumstances shown in FIG. 9.

Thus, although there is susceptibility to the occurrence of error in the relationship with the vehicle C, there is little likelihood of the occurrence of error among each of the vehicles A, B and D, thereby making it possible to realize highly precise interferometric positioning. In contrast, if the vehicle C is decided to be the reference vehicle under the circumstances shown in FIG. 9, there is susceptibility to the occurrence of error in any of the relationships between the vehicle C and the vehicles A, B and D, thereby resulting in exacerbation of positioning precision.

Figure 10:
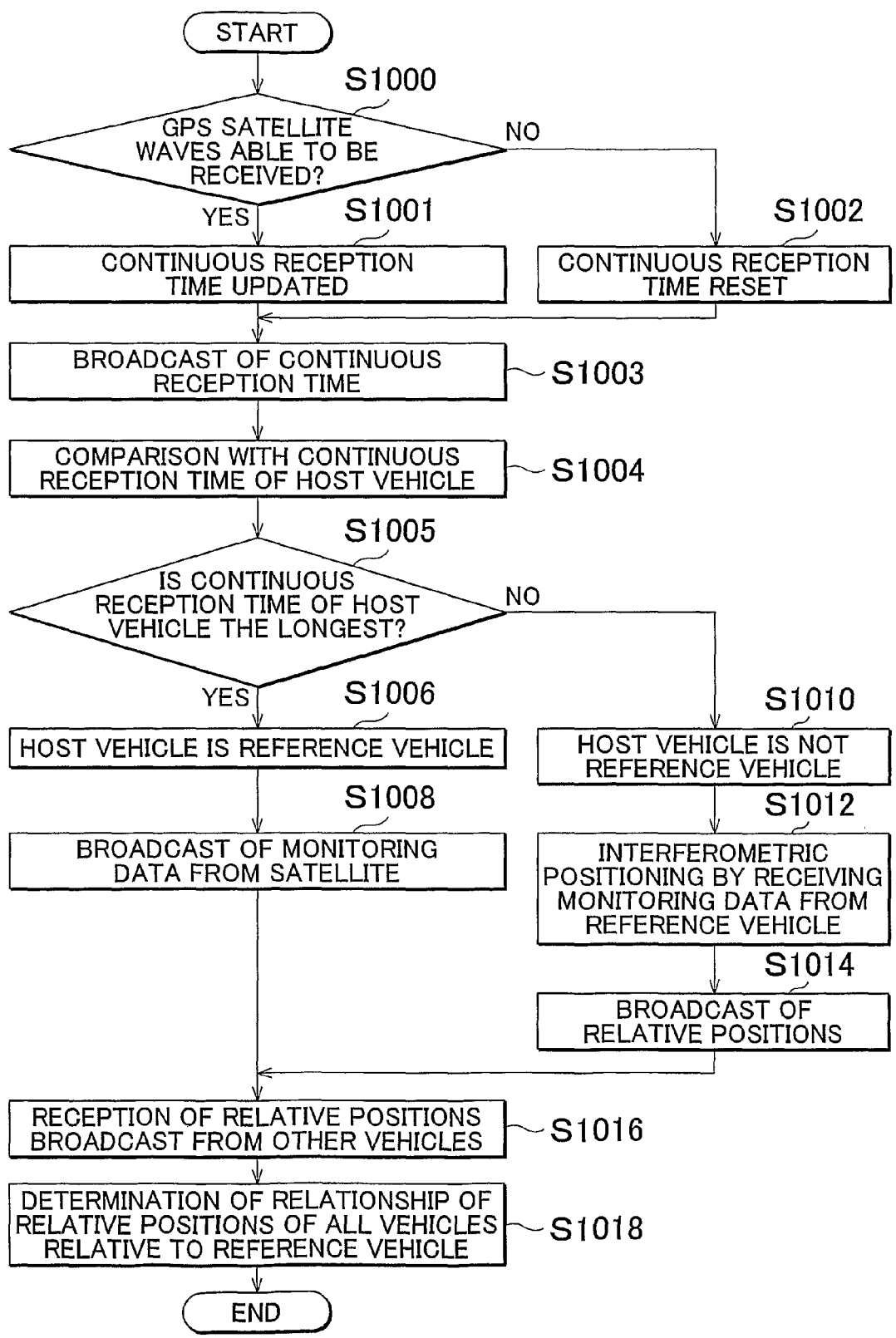
FIG. 10 is a flow chart showing a fourth example of an inter-moving body interferometric positioning system according to the embodiment.

FIG. 10 is a flow chart showing a fourth example of an inter-moving body interferometric positioning system according to this embodiment. Although the processing routine shown in FIG. 10 is explained as being executed in the vehicle A, it is also executed in parallel in the other vehicles B, C and D. Namely, the processing routine shown in FIG. 10 is repeatedly executed at intervals by synchronizing to a fixed sampling time (using GPS time or PPS signals, for example) in each of the vehicles. The GPS receiver 22 or 32 and the vehicle-to-vehicle communication device 24 or 34 of each vehicle executes this processing routine by functioning as an inter-moving body interferometric positioning device.

In step 1000, a determination is made as to whether or not radio waves can be received from a GPS satellite 10. During the time radio waves are able to be received from the GPS satellite 10, continuous reception time is incremented (step 1001), and in the case reception has been interrupted, the continuous reception time is reset to zero (step 1002). Furthermore, continuous reception time may represent the continuous reception time during which radio waves are able to be received from all GPS satellites 10 used for positioning.

In step 1003, the current continuous reception time is broadcast to other vehicles in the vicinity (other vehicles B, C and D).

In step 1004, a comparison is made between the continuous reception times of the other vehicles in the vicinity (the other vehicles B, C and D) broadcast from the other vehicles in the vicinity (refer to step 1003) and the continuous reception time of the host vehicle.

In step 1005, a determination is made as to whether or not the continuous reception time of the host vehicle is the longest reception time in comparison with the continuous reception times of the other vehicles. In the case the continuous reception time of the host vehicle is the longest reception time, processing proceeds to step 1006, while in the case the continuous reception time of the host vehicle is not the longest reception time, processing proceeds to step 1010.

In step 1006, it is determined that the host vehicle should function as the reference vehicle, and the host vehicle becomes the reference vehicle.

In step 1008, monitoring data monitored with the host vehicle is broadcast to the other vehicles in the vicinity (the other vehicles B, C and D). In this case, the previously described interferometric positioning processing is not required to be carried out in the host vehicle.

In step 1010, it is determined that the host vehicle should not function as the reference vehicle. In this case, another vehicle (any of the other vehicles B, C and D) that satisfies the conditions of step 1004 described above becomes the reference vehicle.

In step 1012, monitoring data is received from the reference vehicle, and interferometric positioning processing is executed as previously described.

In step 1014, the interferometric positioning result obtained in the step 1012 (namely the relative position of the host vehicle relative to the reference vehicle) is broadcast to the other vehicles in the vicinity (the other vehicles B, C and D).

In step 1016, the relative positions broadcast from the other vehicles (refer to step 1014) are received. Namely, in the case the host vehicle is the reference vehicle, interferometric positioning results of the other vehicles in the vicinity (the other vehicles B, C and D) (namely, the respective relative positions of the other vehicles B, C and D relative to the host vehicle) are received. In the case the host vehicle is a non-reference vehicle, interferometric positioning results of the other vehicles in the vicinity except for the reference vehicle are received.

In step 1018, the relationship of the relative positions of each of the other vehicles in the vicinity relative to the reference vehicle is determined based on the positioning results received in the step 1016 (and the positioning results of the host vehicle in the case the host vehicle is a non-reference vehicle). In addition, the relationship of the relative positions among non-reference vehicles is determined based on the relationship of the respective relative position of the other vehicles in the vicinity relative to the reference vehicle as necessary.

Figure 11A:
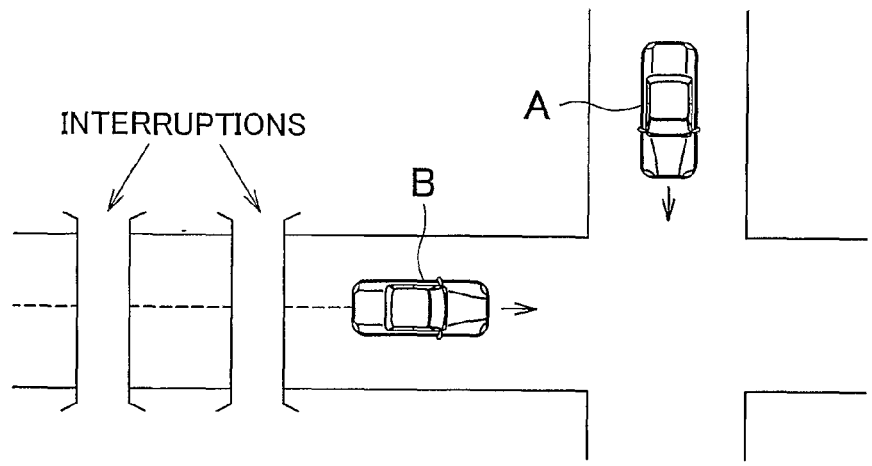
FIGS. 11A to 11C are drawings schematically showing the relationship between GPS wave continuous reception time and operating environment, and differences in smoothing results attributable to differences in continuous reception times.
Figure 11B:
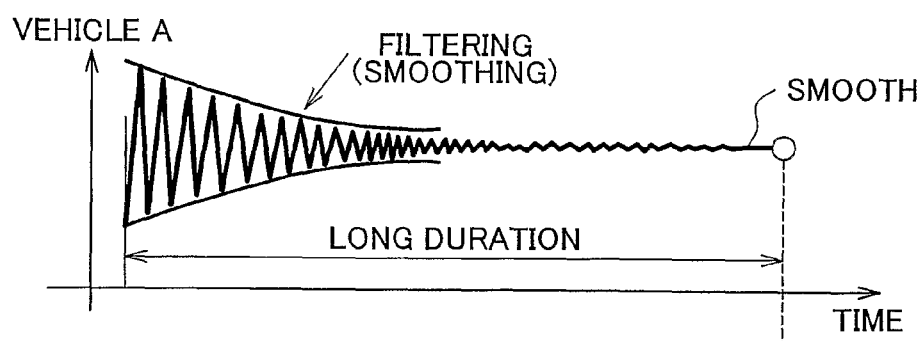
Figure 11C:
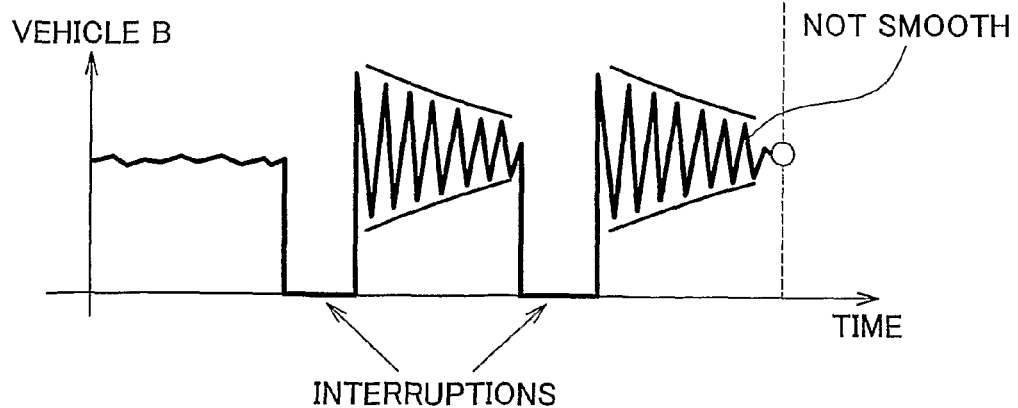

According to the processing shown in FIG. 10 as described above, the vehicle for which the continuous reception time of GPS radio waves is the longest in terms of the relationship with other vehicles in the vicinity is decided to be the reference vehicle, and the relative positions of the other vehicles in the vicinity are determined by interferometric positioning relative to that reference vehicle. Here, in a vehicle having a long GPS radio wave continuous reception time as in the case of vehicle A shown in FIG. 11A, the equivalent pseudo distance on the vertical axis (pseudo distance per se or value obtained by subtracting the amount of change in pseudo distance from the pseudo distance) is smoothened by smoothing (filtering) with a carrier (carrier wave) as shown in FIG. 11B to reduce the effect of noise components contained in the monitoring data (and particularly C/A data). On the other hand, in the case GPS radio waves are interrupted as in vehicle B shown in FIG. 11A, for example, the effects of noise components increase with each interruption as a result of filtering being initialized as shown in FIG. 11C. Thus, according to the processing shown in FIG. 10, since the vehicle for which GPS radio wave continuous reception time is the longest can be used as a reference vehicle, highly precise interferometric positioning can be realized. As a result, highly precise relative positions can be determined and the positional relationship of all other vehicles in the vicinity can be accurately determined by means of the reference vehicle.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed inventions are shown in various example combinations and configurations, other combinations and configurations, including more, less or only a single element, are also within the scope of the appended claims.

For example, although interferometric positioning is carried out in non-reference vehicles other than the reference vehicle, a portion or all of the interferometric positioning calculations carried out in the non-reference vehicles may be executed in the reference vehicle as well. For example, in the case the reference vehicle is vehicle C in the situation shown in FIG. 4, interferometric positioning for relative positions CA may be executed by either the reference vehicle or vehicle A, interferometric positioning for relative positions CB may be executed by either the reference vehicle or vehicle B, and interferometric positioning for relative positions CD may be executed by the reference vehicle or vehicle D. In this case as well, as a result of the vehicle that carried out interferometric positioning broadcasting the interferometric positioning result thereof to other vehicles in the vicinity, interferometric positioning results can be shared among each of the vehicles in the same manner as described in the above embodiment, thereby making it possible to obtain highly precise interferometric positioning results while reducing the positioning load and communication load. Furthermore, in the case all interferometric positioning calculations are executed with the reference vehicle, namely in the case, for example, interferometric positioning for relative positions CA is executed with vehicle C only, interferometric positioning for relative positions CB is executed with vehicle C only, and interferometric positioning for relative positions CD is executed with vehicle C only in the situation shown in FIG. 4, although the calculation load of the reference vehicle becomes large, since the calculation load of the non-reference vehicles is reduced, the resulting effect is that same as the above described embodiment in terms of the overall system. Furthermore, in this case, since interferometric positioning results are broadcast from the vehicle C to the other vehicles in the vicinity, the relationship of the relative positions thereof can be determined in all vehicles while maintaining overall conformity in the same manner as the above described embodiment.

In addition, although deciding on the reference vehicle is respectively executed in each vehicle belonging to a group of vehicles in order to realize an autonomous system, decision of the reference vehicle may also be executed in one or more specific vehicles in the group of vehicles (although only one such vehicle is described in the embodiment, it may be executed by two or more such vehicles as well), or it may be executed in a third vehicle not belonging to that group of vehicles or by roadside equipment (including a center server). In this case, those vehicles that do not execute decision of the reference vehicle directly decide on (determine) the reference vehicle based on information (result of deciding on the reference vehicle) from the other vehicles, the third vehicle or the roadside equipment.

In addition, although a real solution of integral value bias is determined according to an instantaneous positioning method, there are various methods for calculating the real solution of integral value bias, and other methods may be employed in addition to the previously described method. For example, a method can be used that only uses the double phase difference $\Phi^{jh}_{ku}$ of the phase integrated value instead of using the double phase difference $\rho^{jh}_{ku}$ of pseudo distance. In addition, in the case the GPS receivers 22 and 32 are dual wavelength receivers capable of receiving both an L1 wave and L2 wave (frequency: 1227.6 MHz) emitted from a GPS satellite 10, the double phase difference $\Phi^{jh}_{ku}$ of the phase integrated value with respect to the L2 wave may be used additionally or alternatively as the observed quantity Z. In addition, the double phase difference $\Phi^{jh}_{ku}$ of the phase integrated value with respect to a carrier wave of another band range (for example, radio waves of the L5 band scheduled to be added in the future) may be used additionally or alternatively as the observed quantity Z. Similarly, with respect to the double phase difference $\rho^{jh}_{ku}$ of pseudo distance as well, a single or double phase difference $\rho^{jh}_{ku}$ of pseudo distance based on a similar Pseudo Random Noise (PRN) code other than a C/A code (such as a P code) may also be used additionally or alternatively as the observed quantity Z. Although the effects of the initial phase of the oscillators within the GPS receivers 22 and 32, clock error and the like are eliminated by using a double phase difference as described above when calculating the real solution of integral value bias as previously described, a configuration that uses a single phase difference may also be employed. In addition, although ionospheric diffraction effects, tropospheric diffraction effects and the multi-path effect are ignored in the method described above, these may also be taken into consideration. In addition, a Kalman filter may be used instead of the least squares method as another example of the method described above. In this case, instantaneous positioning may be realized in which initialization of state variables and error covariance matrix is carried out for each epoch so that estimation (positioning) results of the previous epoch do not have an effect on estimation results of the current epoch, or state variables and error covariance matrix may be updated (continued to be used) for each epoch by applying an ordinary Kalman filter without initializing state variables and error covariance matrix. In addition, dynamic state quantities such as velocity of a vehicle based on a vehicle sensor (such as a velocity sensor or acceleration sensor) mounted on the vehicle 30 may be introduced in the form of known inputs into a Kalman filter in order to take into consideration dynamic state quantities characteristic of the vehicle attributable to movement of the vehicle 30. In addition, a moving body model for predicting the current state of the vehicle 30 from a movement history of the vehicle 30 may also be introduced into a Kalman filter. In this case, this moving body model may be configured using arbitrary parameters capable of representing the moving state of the vehicle 30, such as position, velocity, acceleration or time rate change of acceleration (differential of acceleration). For example, the velocity v of the vehicle 30 may be introduced into a Kalman filter by composing a moving body model by assuming a first-order Malkov process.

In addition, although examples of applying the invention to GPS are indicated in the above described embodiment, the invention can also be applied to satellite systems other than GPS, such as the Galileo and other global navigation satellite systems (GNSS).

The invention claimed is:

1. An inter-movable object interferometric positioning device, mounted in a movable object, for carrying out positioning in coordination with three or more other movable objects in the vicinity of the movable object, comprising:

a monitoring data acquisition portion that acquires monitoring data consisting of a phase integrated value and a pseudo distance by monitoring navigation satellite signals in the movable object;

a reference movable object decision portion that decides on a single reference movable object from among a host movable object and the other movable objects;

a communication portion that carries out communication between the host movable object and the other movable objects; and a positioning portion that interferometrically determines a relative position of the host movable object relative to the reference movable object and outputting a positioning result by using monitoring data of the host movable object acquired with the monitoring data acquisition portion and monitoring data acquired by the other movable objects, wherein in a case the host movable object has been decided to be the reference movable object by the reference movable object decision portion, the communication portion transmits the monitoring data which are acquired by the monitoring data acquisition portion to the other movable objects, and transmits to all the movable objects including the other movable objects, positioning results which are obtained by interferometric positioning in the other movable object and which show the relative positions of the other movable objects relative to the host movable object, wherein in a case one of the other movable objects is decided to be the reference movable object by the reference movable object decision portion, the communication portion receives navigation satellite signal monitoring data transmitted from the reference movable object, and the positioning portion carries out interferometric positioning using the monitoring data acquired with the monitoring data acquisition portion and the monitoring data monitored in the reference movable object, and transmits the positioning result outputted by the positioning portion to all the movable objects including the reference movable object.

2. The inter-movable object interferometric positioning device according to claim 1, wherein the reference movable object decision portion decides on one specific movable object in a stopped state from among the host movable object and the other movable objects to be the reference movable object.

3. The inter-movable object interferometric positioning device according to claim 1, wherein the reference movable object decision portion decides the reference movable object based on a satellite that can be monitored in the host movable object and a satellite that can be monitored in the other movable objects.

4. The inter-movable object interferometric positioning device according to claim 3, wherein the reference movable object decision portion decides on one specific movable object having at least the minimum required number of common satellites and having the largest number of common satellites from among the host movable object and the other movable objects to be the reference movable object.

5. The inter-movable object interferometric positioning device according to claim 1, wherein the reference movable object decision portion decides the reference movable object based on a alignment of satellites capable of being monitored in the host movable object and each of the positions of the host movable object and the other movable objects.

6. The inter-movable object interferometric positioning device according to claim 5, wherein the reference movable object decision portion decides the reference movable object from among movable objects arranged along a direction of a short axis of an error ellipse determined by the satellite alignment.

7. The inter-movable object interferometric positioning device according to claim 1, wherein the reference movable object decision portion decides the reference movable object based on a reception status of navigation satellite signals in the host movable object and a reception status of navigation satellite signals in the other movable objects.

8. The inter-movable object interferometric positioning device according to claim 7, wherein the reference movable object decision portion decides on one specific movable object having the maximum continuous reception time of navigation satellite signals from among the host movable object and the other movable objects to be the reference movable object.

9. The inter-movable object interferometric positioning device according to claim 1, wherein the reference movable object decision portion is provided in at least one of the host movable object, the other movable objects, and a movable object other than the host movable object and the other movable objects.

10. An inter-movable object interferometric positioning device, mounted in a movable object, for carrying out positioning in coordination with three or more other movable objects in the vicinity of the movable object, comprising:

a monitoring data acquisition portion that acquires monitoring data consisting of a phase integrated value and a pseudo distance by monitoring navigation satellite signals in the movable object;

a reference movable object decision portion that decides on a single reference movable object from among a host movable object and the other movable objects;

a communication portion that carries out communication between the host movable object and the other movable objects; and a positioning portion that interferometrically determines a relative positions of the other movable objects relative to the host movable object and outputting the positioning result by using the monitoring data of the host movable object acquired with the monitoring data acquisition portion and monitoring data acquired by the other movable objects, wherein in a case the host movable object has been decided to be the reference movable object by the reference movable object decision portion, the communication portion receives the monitoring data transmitted from at least one of the other movable objects, the positioning portion interferometrically determines the relative positions of the other movable objects relative to the host movable object using the monitoring data acquired with the monitoring data acquisition portion and the monitoring data received from the other movable objects, and the communication portion transmits positioning result output by the positioning portion to all the movable objects including the other movable objects, wherein in a case one of the other movable objects has been decided to be the reference movable object by the reference movable object decision portion, the communication portion transmits the monitoring data acquired with the monitoring data acquisition portion to the reference movable object, and the communication portion transmits to all the movable objects including the reference movable object, the positioning results which are obtained by interferometric positioning in the reference movable object, and which show the relative position of the host movable object relative to the reference movable object.

11. The inter-movable object interferometric positioning device according to claim 10, wherein the reference movable object decision portion decides on one specific movable object in a stopped state from among the host movable object and the other movable objects to be the reference movable object.

12. The inter-movable object interferometric positioning device according to claim 10, wherein the reference movable object decision portion decides the reference movable object based on a satellite that can be monitored in the host movable object and a satellite that can be monitored in the other movable objects.

13. The inter-movable object interferometric positioning device according to claim 12, wherein the reference movable object decision portion decides on one specific movable object having at least the minimum required number of common satellites and having the largest number of common satellites from among the host movable object and the other movable objects to be the reference movable object.

14. The inter-movable object interferometric positioning device according to claim 10, wherein the reference movable object decision portion decides the reference movable object based on a alignment of satellites capable of being monitored in the host movable object and each of the positions of the host movable object and the other movable objects.

15. The inter-movable object interferometric positioning device according to claim 14, wherein the reference movable object decision portion decides the reference movable object from among movable objects arranged along a direction of a short axis of an error ellipse determined by the satellite alignment.

16. The inter-movable object interferometric positioning device according to claim 10, wherein the reference movable object decision portion decides the reference movable object based on a reception status of navigation satellite signals in the host movable object and a reception status of navigation satellite signals in the other movable objects.

17. The inter-movable object interferometric positioning device according to claim 16, wherein the reference movable object decision portion decides on one specific movable object having the maximum continuous reception time of navigation satellite signals from among the host movable object and the other movable objects to be the reference movable object.

18. The inter-movable object interferometric positioning device according to claim 10, wherein the reference movable object decision portion is provided in at least one of the host movable object, the other movable objects, and a movable object other than the host movable object and the other movable objects.

19. An inter-movable object interferometric positioning method for carrying out positioning in coordination with three or more movable objects that can mutually communicate, comprising:
- acquiring monitoring data consisting of a phase integrated value and a pseudo distance by monitoring navigation satellite signals in each of the three or more movable objects;
- deciding on a single reference movable object from among the three or more movable objects;
- transmitting monitored monitoring data to each of the other two or more movable objects from the reference movable object;
- receiving the monitoring data, transmitted from the reference movable object, in each of the other two or more movable objects;
- interferometrically determining a relative position of a host movable object relative to the reference movable object using the monitoring data monitored in each of the other two or more movable objects and the monitoring data of the reference movable object; and
- transmitting the positioning results obtained in each of the other two or more movable objects to all the movable objects including the reference movable object.

* * * * *